US012330412B2

(12) United States Patent
Kato

(10) Patent No.: US 12,330,412 B2
(45) Date of Patent: Jun. 17, 2025

(54) PRINTING APPARATUS

(71) Applicant: SEIKO EPSON CORPORATION, Tokyo (JP)

(72) Inventor: Kazuhisa Kato, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 260 days.

(21) Appl. No.: 18/068,182

(22) Filed: Dec. 19, 2022

(65) Prior Publication Data

US 2023/0191804 A1 Jun. 22, 2023

(30) Foreign Application Priority Data

Dec. 22, 2021 (JP) ................................ 2021-208269

(51) Int. Cl.
*B41J 11/00* (2006.01)

(52) U.S. Cl.
CPC ........ *B41J 11/0022* (2021.01); *B41J 11/0015* (2013.01); *B41J 11/00222* (2021.01); *B41J 11/00244* (2021.01)

(58) Field of Classification Search
CPC ................ B41J 11/0022; B41J 11/0015; B41J 11/00222; B41J 11/00244
See application file for complete search history.

(56) References Cited

U.S. PATENT DOCUMENTS

| | | | | |
|---|---|---|---|---|
| 5,896,154 | A | 4/1999 | Mitani et al. | |
| 10,071,568 | B2 * | 9/2018 | Miyashita | B41M 5/0017 |
| 2021/0146704 | A1 | 5/2021 | Yoda | |

FOREIGN PATENT DOCUMENTS

| | | |
|---|---|---|
| EP | 3842246 | 6/2021 |
| JP | 2012-206368 A | 10/2012 |

* cited by examiner

*Primary Examiner* — Geoffrey S Mruk
(74) *Attorney, Agent, or Firm* — WORKMAN NYDEGGER

(57) ABSTRACT

A first air blowing unit includes a first air blowing flow path. A second air blowing unit includes a second air blowing flow path and a communication port. The second air blowing flow path has a greater cross-sectional area for blowing air than a cross-sectional area of the first air blowing flow path. The first air blowing unit is located downstream from a carriage and upstream from a processing unit. A part or all of the second air blowing unit is located between a housing and the processing unit. The first air blowing unit and the second air blowing unit are provided at positions where the first air blowing unit and the second air blowing unit face each other in a first specific region along the scanning direction of the carriage. The communication port is located at least in the first specific region.

18 Claims, 9 Drawing Sheets

PRINTING APPARATUS

The present application is based on, and claims priority from JP Application Serial Number 2021-208269, filed Dec. 22, 2021, the disclosure of which is hereby incorporated by reference herein in its entirety.

BACKGROUND

1. Technical Field

The present disclosure relates to a printing apparatus that performs printing by ejecting liquid onto a medium.

2. Related Art

For example, JP-A-2012-206368 discloses a printing apparatus that performs printing on a medium by moving a carriage in a scanning direction and discharging liquid onto the medium from a printing head mounted on the carriage. In such a printing apparatus, in order to dry the medium after printing, an air blowing unit that blows air is provided downstream from the carriage in the transport direction of the medium.

However, in such a printing apparatus, there is a demand for space saving of the apparatus itself, and in particular, there is room for improvement in order to realize space saving of the configuration in the transport direction of the medium.

SUMMARY

A printing apparatus that solves the above problems includes: a transport unit configured to transport a medium in a transport direction; a printing head configured to perform printing by ejecting liquid onto the medium transported by the transport unit; a carriage mounted with the printing head and configured to move in a scanning direction; an air blowing unit configured to blow air to the medium after printing on which printing is performed by the printing head; a processing unit configured to perform processing related to the medium; and a housing configured to accommodate the transport unit, the printing head, the carriage, the air blowing unit, and the processing unit, wherein the air blowing unit includes a first air blowing unit configured to blow air, a second air blowing unit configured to blow air to the first air blowing unit, an airflow generation unit configured to generate airflow in the first air blowing unit and the second air blowing unit, and an air blowing port configured to blow the air from the first air blowing unit to the medium after printing, the first air blowing unit includes a first air blowing flow path configured to blow air to the air blowing port, the second air blowing unit includes a second air blowing flow path configured to blow air to the first air blowing flow path and a communication port configured for communication between the second air blowing flow path and the first air blowing flow path, the second air blowing flow path has a greater cross-sectional area for blowing air than a cross-sectional area of the first air blowing flow path, the first air blowing unit is located downstream from the printing head in the transport direction of the medium and upstream from the processing unit in the transport direction of the medium, a part or all of the second air blowing unit is located between the housing and the processing unit in a direction along the scanning direction of the carriage, the first air blowing unit and the second air blowing unit are provided at positions where the first air blowing unit and the second air blowing unit face each other in the transport direction of the medium in a first specific region along the scanning direction of the carriage, and the communication port is located at least in the first specific region.

DESCRIPTION OF EXEMPLARY EMBODIMENTS

First Embodiment

Figure 1:
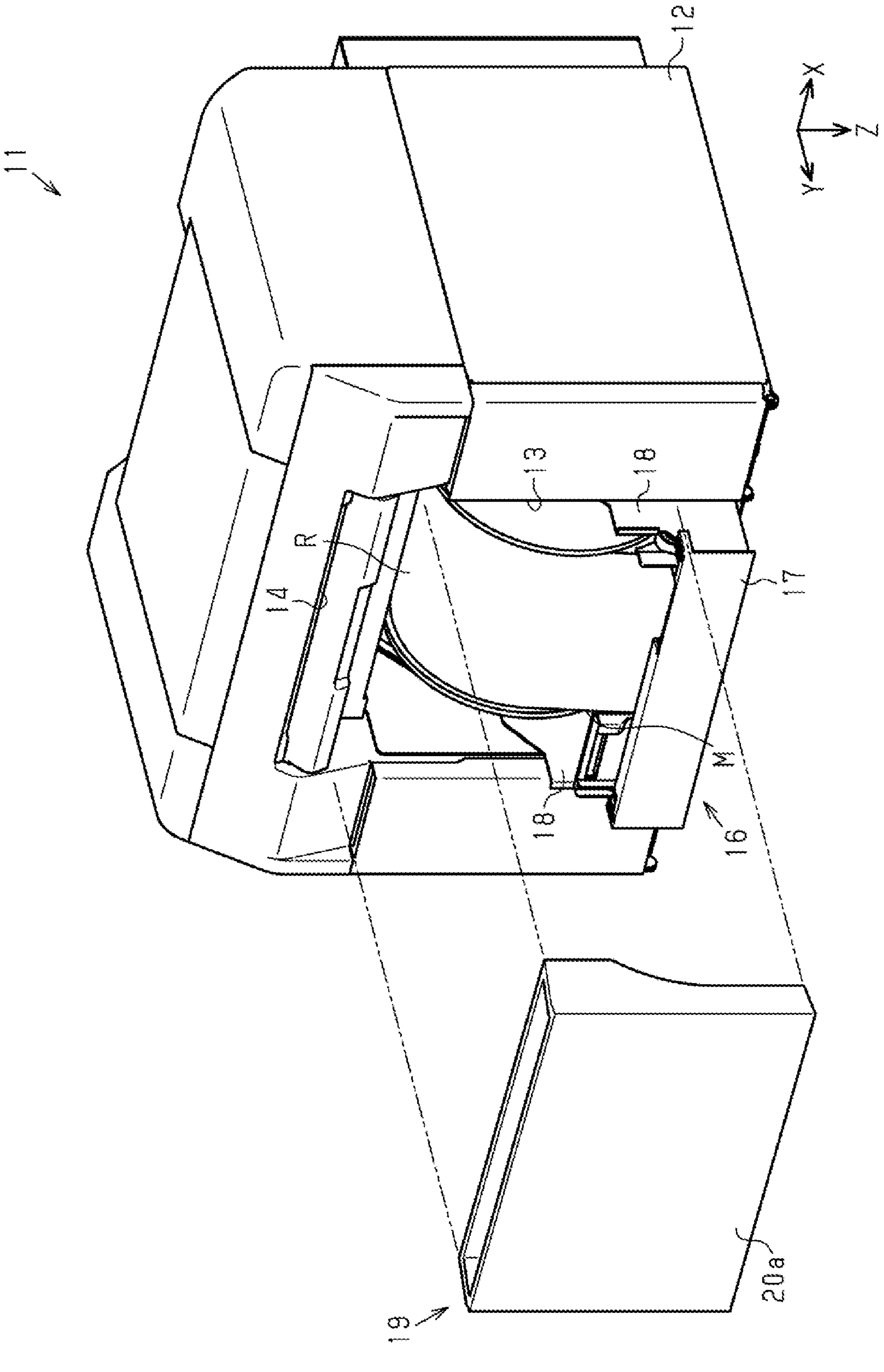
FIG. 1 is a perspective view of a printing apparatus.

Hereinafter, exemplary embodiments of a printing apparatus will be described with reference to the drawings. The printing apparatus according to the present exemplary embodiment is a serial inkjet printer. In the drawings, the direction of gravity is indicated by a Z-axis while assuming that the printing apparatus is placed at a horizontal surface, and the directions along the horizontal plane are indicated by an X-axis and a Y-axis. The X-axis, the Y-axis, and the Z-axis are mutually orthogonal. In addition, a direction parallel to the X-axis may be referred to as a width direction X, a direction parallel to the Y-axis may be referred to as a transport direction Y, and a direction parallel to the Z-axis may be referred to as a vertical direction Z.

Configuration of Printing Apparatus 11

As illustrated in FIG. 1, the printing apparatus 11 includes a housing 12. The housing 12 accommodates various components of the printing apparatus 11. The housing 12 may accommodate a roll body R. In the roll body R, a long medium M is wound in a cylindrical shape.

The housing 12 may include an opening portion 13. The opening portion 13 is exposed on the front surface of the housing 12. The housing 12 may include a discharge port 14. The discharge port 14 is provided above the opening portion 13 on the front surface of the housing 12. The medium M on which printing is performed is discharged from the discharge port 14.

The printing apparatus 11 may include a feeding portion 16. The feeding portion 16 feeds the medium M from the roll body R. The feeding portion 16 can be pulled out from the housing 12 through the opening portion 13. The feeding portion 16 may include a front plate portion 17 and a pair of support walls 18. The front plate portion 17 constitutes a part of the exterior of the printing apparatus 11 when accommodated in the housing 12. The pair of support walls 18 rotatably supports the roll body R.

The printing apparatus 11 may include an accommodation unit 19. The accommodation unit 19 is a box body having a bottom, and an upper side thereof in the vertical direction Z is exposed. The accommodation unit 19 can accommodate cutting waste that is cut off from the long medium M. The accommodation unit 19 may be detachably attached to the housing 12.

Internal Configuration of Printing Apparatus 11

Figure 2:
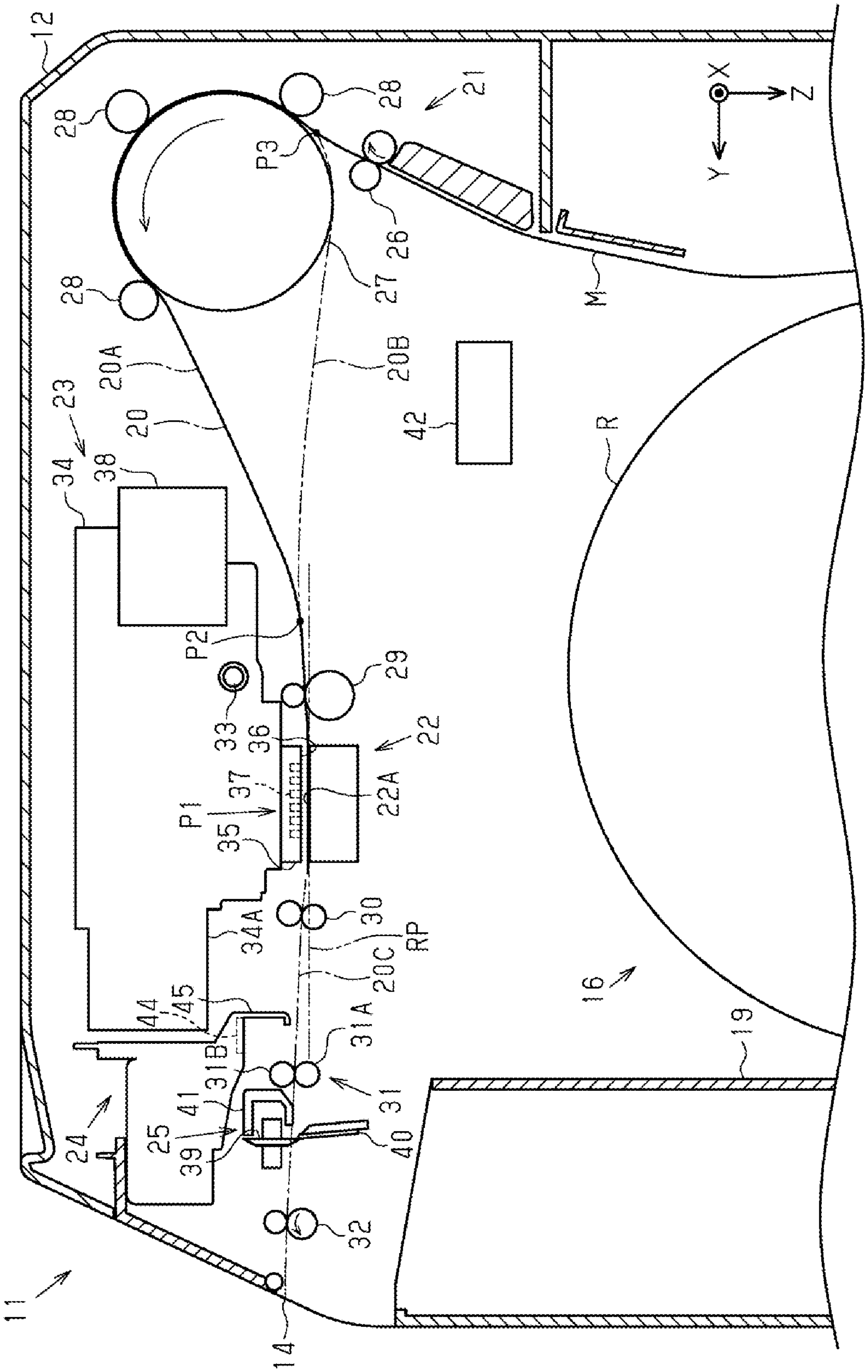
FIG. 2 is a schematic view illustrating the printing apparatus.

As illustrated in FIG. 2, the printing apparatus 11 includes a transport path 20 indicated by a chain line. The transport path 20 is a path through which the medium M can be transported. The transport path 20 runs from the feeding portion 16 located furthest upstream to the discharge port 14 located furthest downstream.

The printing apparatus 11 includes a transport unit 21, a support portion 22, a printing unit 23, an air blowing unit 24, and a cutting unit 25. The transport unit 21, the supporting unit 22, the printing unit 23, the air blowing unit 24, and the cutting unit 25 are accommodated in the housing 12.

The transport unit 21 is configured to transport the medium M in the transport direction Y along the transport path 20. It can be said that the transport direction Y is a transport direction of the medium M. The transport path 20 includes a supply path 20A, a reverse path 20B, and a discharge path 20C. When a position at which printing is performed by the printing unit 23 is a printing position P1, the supply path 20A is a path that couples the feeding portion 16 and the printing position P1. The reverse path 20B is a path that couples a branch point 20A that branches off from the supply path P2 and a merging point P2 that merges with the supply path 20A upstream from the branch point P3. The discharge path 20C is a path that couples the printing position P1 and the discharge port 14 in the transport path 20.

The transport unit 21 may unwind the medium M from the roll body R and transport the medium M. The transport unit 21 may include a supply roller pair 26, a reversing roller 27, a plurality of driven rollers 28, and an upstream transport roller pair 29 in this order from the upstream of the feed path 20A. The driven roller 28 is rotatably provided and is driven to rotate with the medium M sandwiched between the driven roller 28 and the reversing roller 27.

The transport unit 21 includes a downstream transport roller pair 30, a first roller pair 31, and a second roller pair 32 in this order from the upstream of the discharge path 20C. The first roller pair 31 is located upstream from the cutting unit 25 in the transport path 20. The first roller pair 31 includes a driving roller 31A and a driven roller 31B. The second roller pair 32 is located downstream from the cutting unit 25 in the transport path 20. In this manner, the first roller pair 31 and the second roller pair 32 are located sandwiching the cutting unit 25 in the transport direction Y and press the medium after printing M.

The supply roller pair 26, the reversing roller 27, the driven roller 28, the upstream transport roller pair 29, the downstream transport roller pair 30, the first roller pair 31, and the second roller pair 32 transport the medium M by rotating in the state of sandwiching the medium M. The transport unit 21 transports the medium M from upstream to downstream by being driven to rotate in the normal direction, and transports the medium M from downstream to upstream by being driven to rotate in the reverse direction.

The support portion 22 is configured to support the medium M transported by the transport unit 21. The support portion 22 supports, from below in the vertical direction Z, a portion of the medium M on which printing is performed by the printing unit 23. The support portion 22 includes a support surface 22A that supports the medium M. The support surface 22A has a surface perpendicular to the vertical direction Z. The support surface 22A is located below a printing head 35 described below in the vertical direction Z.

The printing apparatus 11 includes a guide shaft 33. The guide shaft 33 is provided extending in the width direction X.

The printing unit 23 is configured to perform printing on the medium M supported by the support portion 22. The printing unit 23 includes a carriage 34 and the printing head 35. The carriage 34 can reciprocate along the guide shaft 33 in the width direction X. That is, the width direction X is a direction along the scanning direction in which the carriage 34 moves, and corresponds to an example of the scanning direction in which the carriage 34 moves.

The printing head 35 is mounted on the carriage 34. The printing head 35 is provided below the carriage 34. The printing head 35 is a serial head type printing head that ejects liquid in association with movement of the carriage 34 in the width direction X. The liquid may be, for example, ink. The liquid may have, for example, one type of color or a plurality of types of colors.

The printing head 35 includes a nozzle surface 36 and a plurality of nozzles 37. The nozzle surface 36 is a surface facing the support surface 22A of the support portion 22. The plurality of nozzles 37 are formed at the nozzle surface 36. The plurality of nozzles 37 can eject the liquid. In this manner, the printing head 35 is configured to be able to eject liquid from the plurality of nozzles 37 onto the medium M. That is, the printing head 35 is configured to perform printing by ejecting liquid onto the medium M supported by the support portion 22.

The printing unit 23 includes a carriage motor 38. The carriage motor 38 is mounted on the carriage 34. The carriage motor 38 is a drive source for moving the carriage 34 in the width direction X.

The air blowing unit 24 can blow air to the medium after printing M. The air blowing unit 24 is located downstream from the printing position P1 and upstream from the discharge port 14 in the transport path 20. The air blowing unit 24 is located above the medium after printing M transported on the transport path 20 in the vertical direction Z. The air blowing unit 24 is configured to dry the medium after printing M by blowing air to the medium after printing M.

The cutting unit 25 is configured to cut the medium after printing M. The cutting unit 25 is located downstream from the printing position P1 and upstream from the discharge port 14 in the transport path 20. The cutting unit 25 is located above the accommodation unit 19 that is attached to the housing 12. In addition, the cutting unit 25 is located below the air blowing unit 24, and is located downstream from an air blowing port 44 described below in the transport direction Y. In the present exemplary embodiment, the cutting unit 25 corresponds to an example of a processing unit that performs processing related to the medium M.

Specifically, the cutting unit 25 includes a movable blade 39, a fixed blade 40, and a guide member 41. A blade line of the movable blade 39 extends in the width direction X intersecting the transport path 20. The movable blade 39 is attached movably along the blade line of the fixed blade 40. A blade line of the fixed blade 40 extends in the width direction X intersecting the transport path 20. The guide member 41 is provided extending along the blade line of the fixed blade 40. The guide member 41 guides the movement of the movable blade 39. The cutting unit 25 cuts the medium M in the width direction X by the movable blade 39 reciprocating in the direction along the blade line of the fixed blade 40 at a position of the blade edge of the fixed blade 40 in the transport path 20. In this manner, the cutting unit 25 can cut the medium after printing M pressed by the first roller pair 31 and the second roller pair 32.

The printing apparatus 11 includes a control unit 42. The control unit 42 may comprehensively control driving of each mechanism in the printing apparatus 11 and control various operations executed in the printing apparatus 11. The control unit 42 may include one or more processors that perform various processes according to a computer program, one or more dedicated hardware circuits, such as an application-specific integrated circuit, that performs at least some of the various processes, or a combination thereof. The processor includes a CPU and a memory. The memory is a random access memory (RAM), a read-only memory (ROM), etc., and stores a program code or a command configured to cause the CPU to execute the processing. The memory, that is, a computer readable medium includes all kinds of readable media accessible by a general purpose or dedicated computer.

Configuration of Printing Unit 23

Here, the printing unit 23 will be described with reference to FIG. 3.

Figure 3:
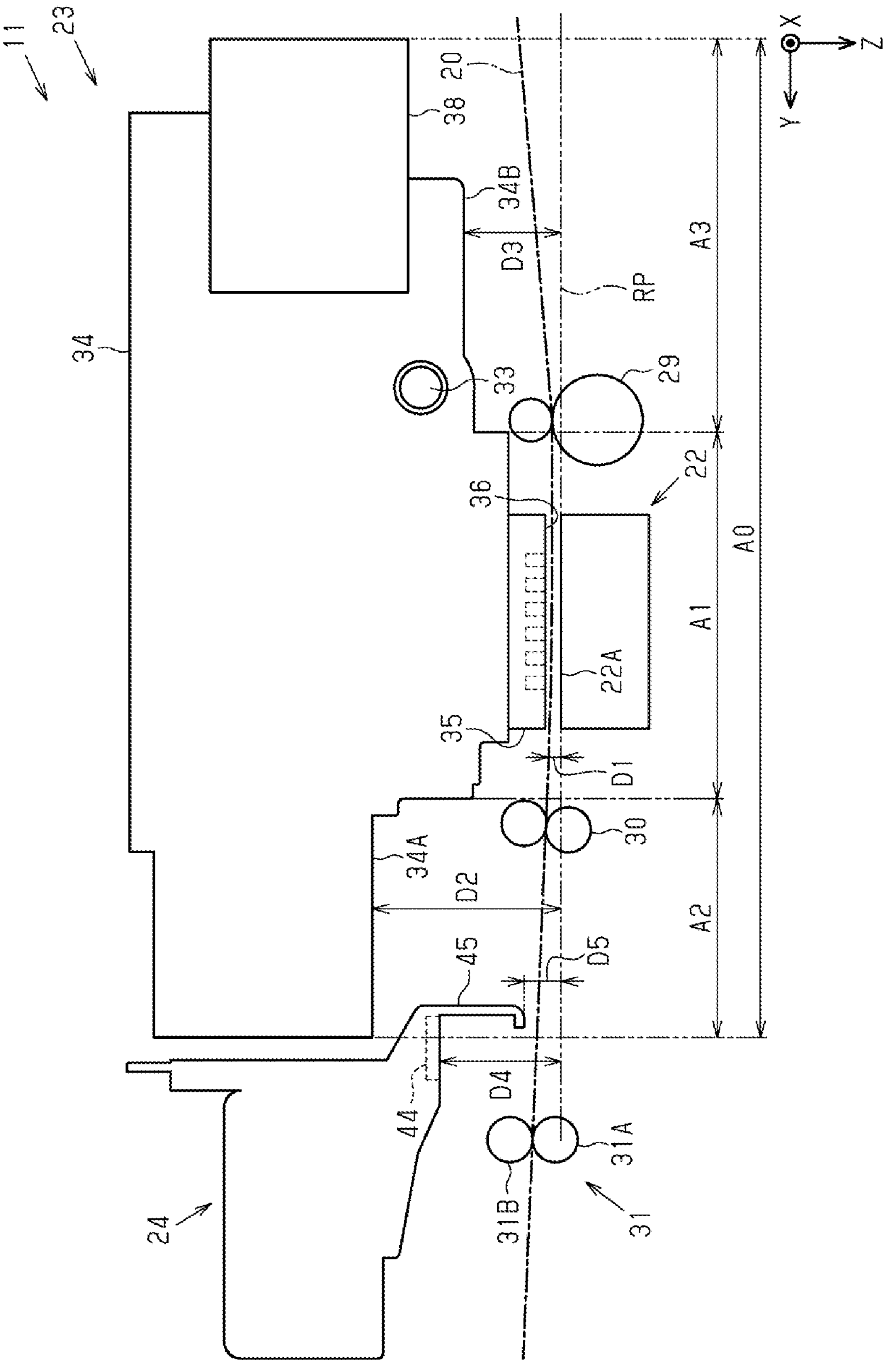
FIG. 3 is a schematic view illustrating the printing apparatus.

As illustrated in FIG. 3, a region A0 of the carriage 34 can be divided into a first region A1, a second region A2, and a third region A3. The first region A1, the second region A2, and the third region A3 are regions different from each other and are regions divided in the transport direction Y in plan view.

The first region A1 is a region located at the center in the region A0 in the transport direction Y. The second region A2 is a region downstream from the first region A1 in the region A0 in the transport direction Y. That is, the second region A2 is located downstream from the first region A1 in the transport direction Y, and is located furthest downstream from the region A0 in the transport direction Y. The third region A3 is a region upstream from the first region A1 in the region A0 in the transport direction Y. That is, the third region A3 is located upstream from the first region A1 in the transport direction Y, and is located furthest upstream from the region A0 in the transport direction Y.

The first region A1 is a region including the printing head 35. In this manner, the printing head 35 is not mounted in the second region A2 and the third region A3, but is mounted in the first region A1. The nozzle surface 36 of the printing head 35 is a bottom surface in the first region A1. The nozzle surface 36 is located at a first distance D1 along the vertical direction Z from a reference plane RP including the support surface 22A.

The second region A2 is a region including a supplying flow path and a control board (not illustrated). The supply flow path is a flow path for supplying liquid to the plurality of nozzles 37. The control board is a board on which electronic components for controlling the carriage 34 are mounted.

A bottom surface 34A in the second region A2 is located at a second distance D2 from the reference plane RP along the vertical direction Z. The second distance D2 is longer than the first distance D1. In other words, the bottom surface 34A in the second region A2 has a longer distance from the support surface 22A along the vertical direction Z than the nozzle surface 36 in the first region A1. Accordingly, a wider space is provided below the bottom surface 34A in the second region A2 in the vertical direction Z than below the nozzle surface 36 in the first region A1 in the vertical direction Z. Thus, the second region A2 is provided at a position farther from the reference plane RP than the first region A1 is.

The third region A3 is a region provided with the carriage motor 38. A bottom surface 34B in the third region A3 is located at a third distance D3 from the reference plane RP along the vertical direction Z. The third distance D3 is longer than the first distance D1 and shorter than the second distance D2.

Configuration of Air Blowing Unit 24

Figure 4:
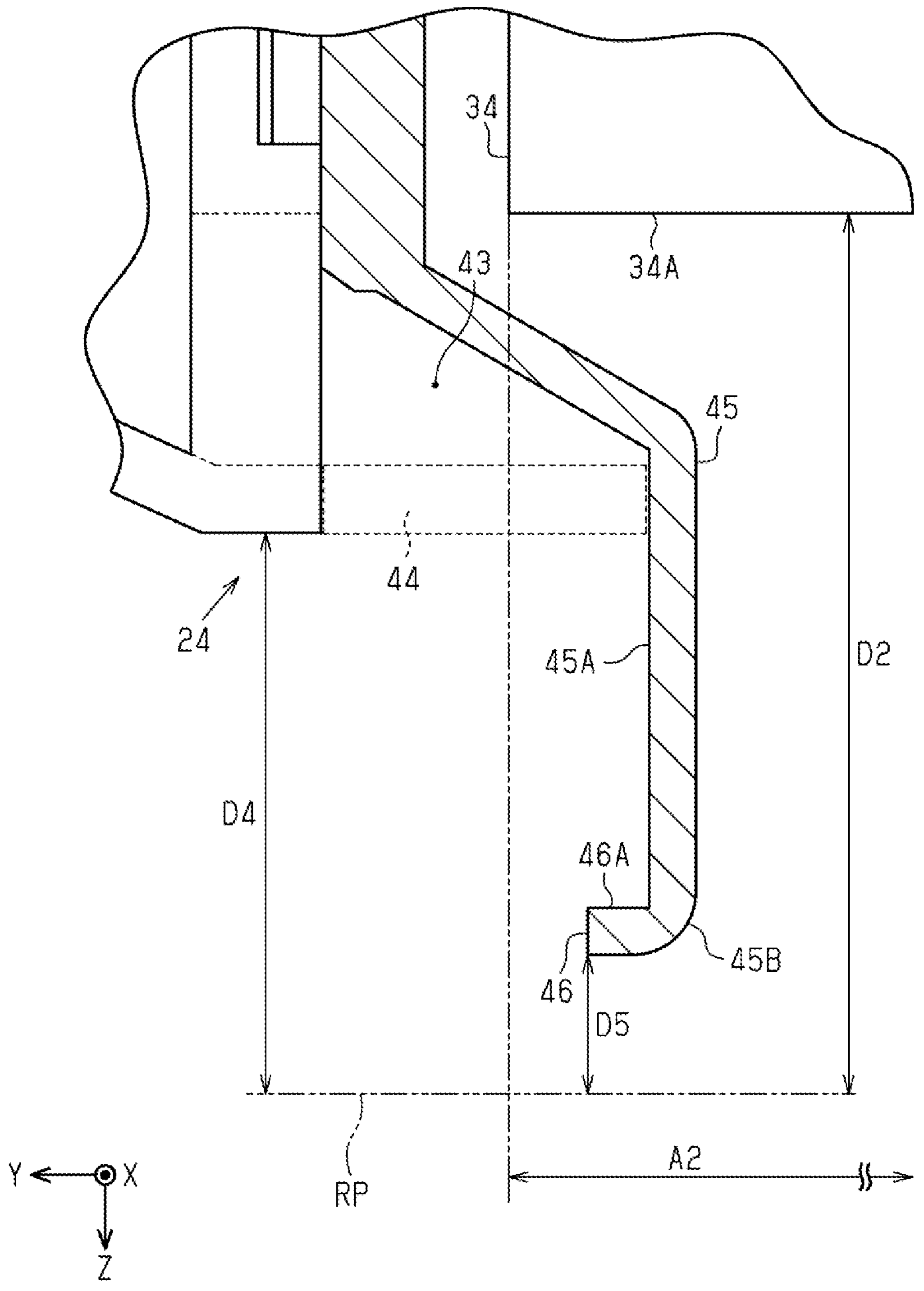
FIG. 4 is a cross-sectional view illustrating the printing apparatus.

Next, the air blowing unit 24 will be described with reference to FIGS. 3 and 4. FIG. 4 is a cross-sectional view of the carriage 34 and the air blowing unit 24 when viewed in the width direction X. In FIG. 4, in order to facilitate understanding of the disclosure, a part of an air blowing flow path 43 is omitted.

As illustrated in FIGS. 3 and 4, the air blowing unit 24 can blow air for drying the medium after printing M. The air blowing unit 24 includes the air blowing flow path 43 and the air blowing port 44. The air blowing flow path 43 is a flow path through which air for drying the medium after printing M can be blown. As will be described in detail later, the air blowing flow path 43 is provided extending along the width direction X.

The air blowing port 44 is located at a lower end portion of the air blowing unit 24 in the vertical direction Z and at an upstream portion of the air blowing unit 24 in the transport direction Y. The air blowing port 44 is provided extending along the width direction X. The air blowing port 44 communicates with the air blowing flow path 43. The air blowing port 44 is an opening that is exposed toward the medium after printing M. In this manner, the air blowing port 44 can blow the air from the air blowing flow path 43 to the medium after printing M.

As illustrated in FIG. 4, the air blowing unit 24 includes a partition wall 45. The partition wall 45 is located upstream from the air blowing port 44 in the transport direction Y. The partition wall 45 is provided extending along the vertical direction Z. In particular, the partition wall 45 is provided upstream from the air blowing port 44 in the transport direction Y to extend downward from the air blowing port 44 in the vertical direction Z. That is, the partition wall 45 is provided extending from the air blowing port 44 toward the medium after printing M. The partition wall 45 includes a first surface 45A. The first surface 45A is a surface on the downstream in the transport direction Y. The first surface 45A blocks the air blown from the air blowing port 44.

In this manner, the partition wall 45 divides the region where the air blowing unit 24 is located and the region where the carriage 34 is located. That is, the partition wall 45 has a function of blocking the air blown from the air blowing port 44 and making the air less likely to be blown from the air blowing port 44 to travel upstream in the transport direction Y. The partition wall 45 is also used as a member that forms the air blowing flow path 43 and the air blowing port 44.

The partition wall 45 includes a protruding portion 46. The protruding portion 46 is provided at a lower end portion 45B of the partition wall 45. The protruding portion 46 protrudes downstream in the transport direction Y between the air blowing port 44 and the medium after printing M.

An upper surface 46A of the protruding portion 46 is located facing a partial region of the air blowing port 44 in the vertical direction Z. Accordingly, the protruding portion 46 blocks the air blown from the air blowing port 44 and guides the air downstream in the transport direction Y. That is, the protruding portion 46 functions as a barb that makes the air less likely to be blown from the air blowing port 44 to travel upstream in the transport direction Y.

The air blowing port 44 is located at a fourth distance D4 from the reference plane RP along the vertical direction Z. The fourth distance D4 is longer than the first distance D1. That is, the air blowing port 44 is provided at a position farther from the reference plane RP than the nozzle surface 36 is. Further, the fourth distance D4 is shorter than the second distance D2.

The lower end portion 45B and the protruding portion 46 of the partition wall 45 are located at a fifth distance D5 from the reference plane RP along the vertical direction Z. The fifth distance D5 is longer than the first distance D1. That is, the partition wall 45 and the protruding portion 46 are provided at a position farther from the reference plane RP than the nozzle surface 36 is. Further, the fifth distance D5 is shorter than the second distance D2.

In addition, a partial region of the air blowing port 44, the partition wall 45, and the protruding portion 46 are provided at a position where they overlap with the second region A2 of the carriage 34 in the vertical direction Z. The fourth distance D4 and the fifth distance D5 are shorter than the second distance D2. In this manner, the partial region of the air blowing port 44, a part of the partition wall 45, and the protruding portion 46 are located between the bottom surface 34A in the second region A2 of the carriage 34 and the medium after printing M. In other words, the air blowing unit 24 is provided such that a part of the air blowing port 44 is located between the second region A2 of the carriage 34 and the medium after printing M.

In addition, it can be said that a partial region of the air blowing port 44, the partition wall 45, and the protruding portion 46 overlap with a partial region of the second region A2 in plan view. That is, as will be described later in detail with reference to FIG. 5, the air blowing unit 24 is provided overlapping with a part of a movement region MA of the carriage 34 in plan view. The air blowing unit 24 is provided such that a part of the air blowing port 44 is located between the second region A2 of the carriage 34 and the medium after printing M at a position where the part of the air blowing port 44 overlaps with the part of the movement region MA of the carriage 34 in plan view. In other words, the air blowing unit 24 is provided such that a part of the air blowing port 44 overlaps with the part of the movement region MA of the carriage 34 in plan view.

Positional Relationship Between Carriage 34, Air Blowing Unit 24, and Cutting Unit 25

Figure 5:
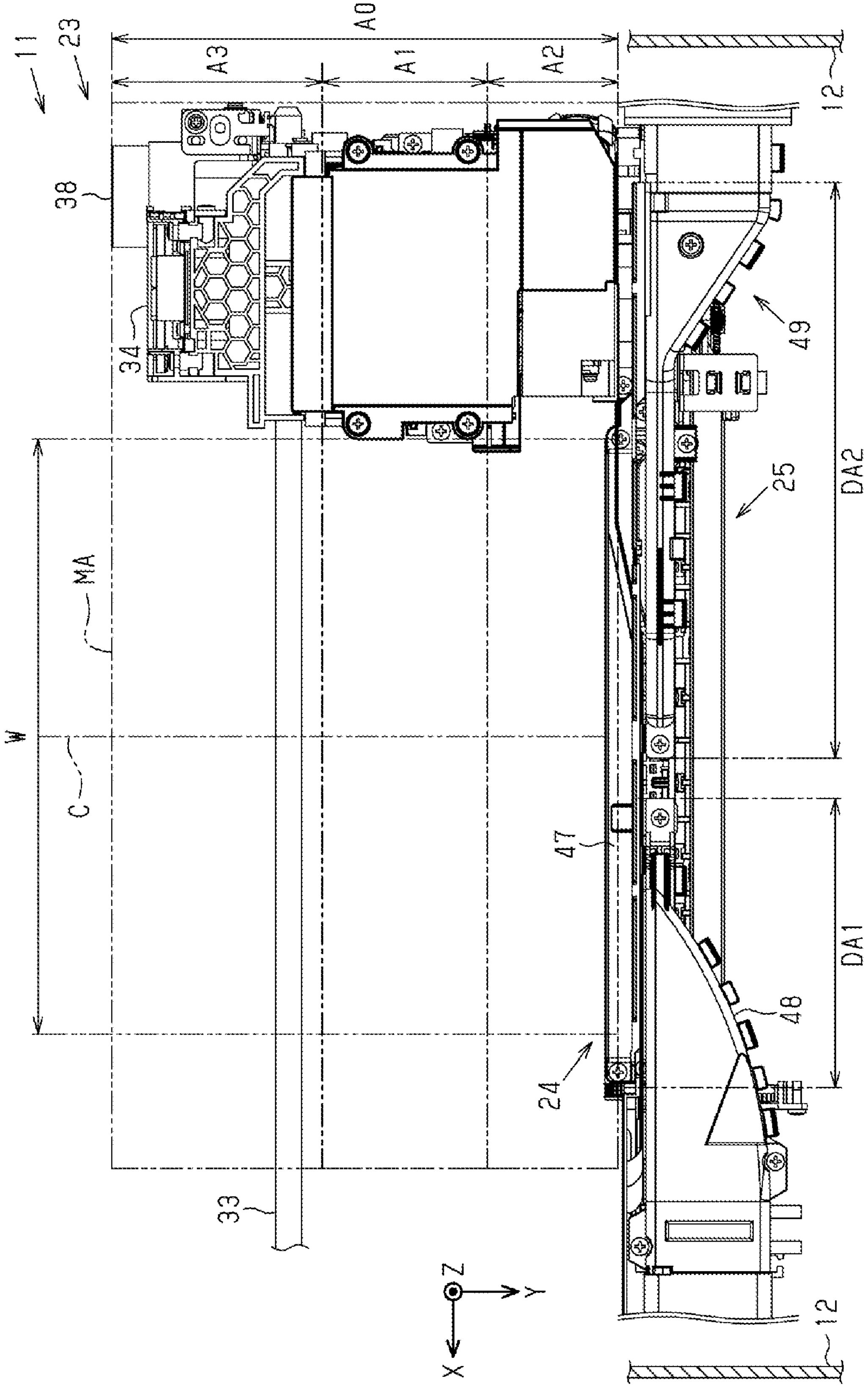
FIG. 5 is a top view illustrating the printing apparatus.

Next, a positional relationship among the carriage 34, the air blowing unit 24, and the cutting unit 25 will be described with reference to FIG. 5. FIG. 5 is a view of the carriage 34, the air blowing unit 24, and the cutting unit 25 when viewed from above in the vertical direction Z.

As illustrated in FIG. 5, the carriage 34 can reciprocate along the guide shaft 33 in the width direction X. The carriage 34 can move in the width direction X over the movement region MA. The movement region MA of the carriage 34 corresponds to a range that is longer than the width W of the medium M and traverses the medium M in the width direction X.

The air blowing unit 24 is located downstream from the printing head 35 of the carriage 34 in the transport direction Y. The air blowing unit 24 is provided extending in the width direction X. The air blowing unit 24 is fixed to a member (not illustrated) and is immovably provided with respect to the housing 12. That is, the air blowing unit 24 does not move in association with the movement of the carriage 34.

A part of the air blowing unit 24 overlaps with a part of the movement region MA of the carriage 34 in plan view. Specifically, a part of the air blowing unit 24 overlaps with a partial region of the second region A2 in the movement region MA of the carriage 34 in plan view. As described above, the air blowing unit 24 is provided overlapping with a part of the movement region MA of the carriage 34 in plan view.

The air blowing unit 24 includes a first air blowing unit 47 and a second air blowing unit 48. The first air blowing unit 47 can blow air. The second air blowing unit 48 can blow air for drying the medium after printing M to the first air blowing unit 47. Thus, the first air blowing unit 47 can blow the air from the second air blowing unit 48 to the air blowing port 44. The air blowing port 44 can blow the air from the first air blowing unit 47 to the medium after printing M.

The first air blowing unit 47 is provided extending in the width direction X. The first air blowing unit 47 is longer than the width W of the medium M and is provided traversing the medium M in the width direction X. The width W of the medium M is the maximum width of the medium M that can be transported on the transport path 20. The first air blowing unit 47 is located partially overlapping with the second region A2 in the movement region MA of the carriage 34 in plan view. In addition, the first air blowing unit 47 is located downstream from the first region A1 in the transport direction Y in the movement region MA of the carriage 34. That is, the first air blowing unit 47 is located downstream from the printing head 35 in the transport direction Y. The first air blowing unit 47 is located upstream from the cutting unit 25 in the transport direction Y.

The second air blowing unit 48 is provided extending in the width direction X. The second air blowing unit 48 is shorter than the width W of the medium M in the width direction X, and is provided without reaching a center C of the width W of the medium M and without traversing the medium M. The second air blowing unit 48 is located downstream from the first air blowing unit 47 in the transport direction Y.

The second air blowing unit 48 is provided at a position where the second air blowing unit 48 overlaps with the first air blowing unit 47 in a first overlapping region DA1 when viewed from the downstream in the transport direction Y. The first overlapping region DA1 is a region along the width direction X. In this manner, the first air blowing unit 47 and the second air blowing unit 48 are provided at positions where they face each other in the transport direction Y in the first overlapping region DA1. The first overlapping region DA1 corresponds to an example of a first specific region. A part of the second air blowing unit 48 is located between the cutting unit 25 and the housing 12 in the width direction X.

The cutting unit 25 is provided extending in the width direction X. The cutting unit 25 is longer than the width W of the medium M and is provided traversing the medium M in the width direction X. The cutting unit 25 is located downstream from the carriage 34 in the transport direction Y. The cutting unit 25 is located downstream from the first air blowing unit 47 in the transport direction Y.

The printing apparatus 11 includes an exhaust unit 49. The exhaust unit 49 can exhaust air. In particular, the exhaust unit 49 can exhaust air at a printing position P1 where printing on the medium M is performed and in a region where the medium after printing M is transported.

The exhaust unit 49 is provided extending in the width direction X. The exhaust unit 49 is shorter than the width W of the medium M in the width direction X, and is provided without reaching a center C of the width W of the medium M and without traversing the medium M. The exhaust unit 49 is located downstream from the first air blowing unit 47 in the transport direction Y.

The exhaust unit 49 is provided at a position where the exhaust unit 49 overlaps with the first air blowing unit 47 in a second overlapping region DA2 when viewed from the downstream in the transport direction Y. The second overlapping region DA2 is a region along the width direction X. In this manner, the first air blowing unit 47 and the exhaust unit 49 are provided at positions where they face each other in the transport direction Y in the second overlapping region DA2. The exhaust unit 49 is provided between the cutting unit 25 and the housing 12 in the width direction X at a position opposite to the second air blowing unit 48 across the cutting unit 25. The second overlapping region DA2 corresponds to an example of a second specific region.

Configuration of Second Air Blowing Unit 48

Figure 6:
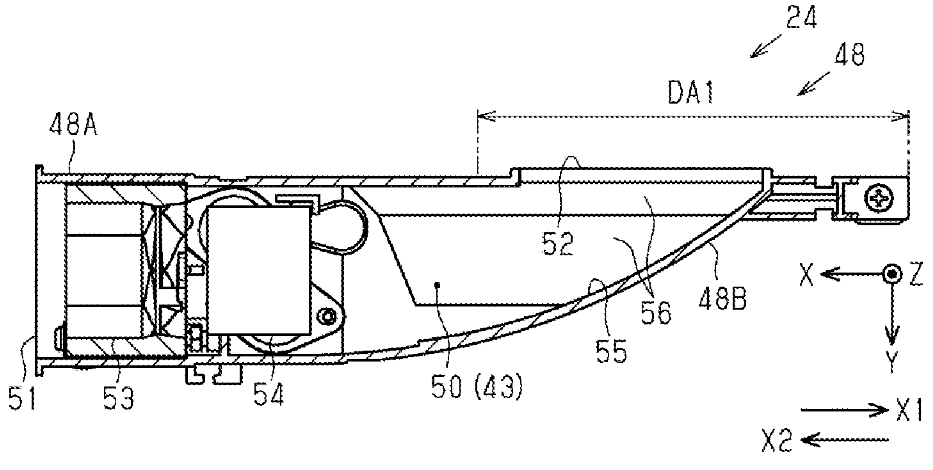
FIG. 6 is a cross-sectional view illustrating a second air blowing unit.
Figure 7:
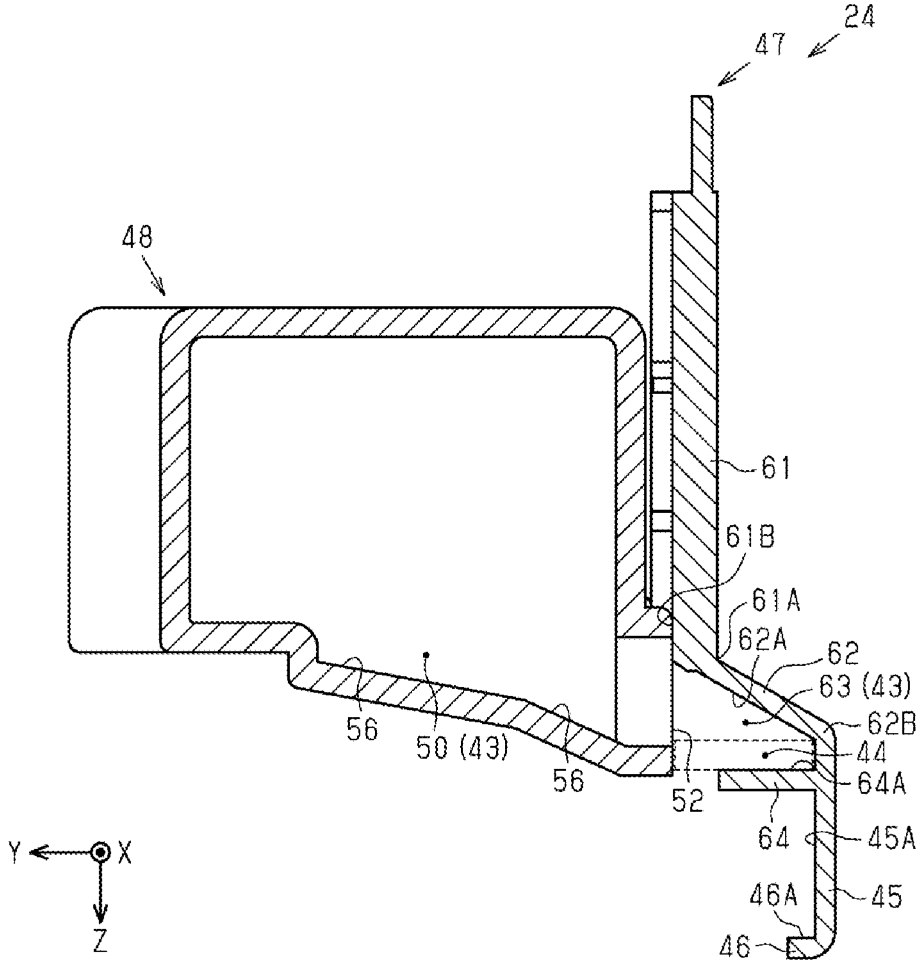
FIG. 7 is a cross-sectional view illustrating a first air blowing unit and the second air blowing unit.

Next, the second air blowing unit 48 will be described with reference to FIGS. 6 and 7. FIG. 6 is a cross-sectional view of the second air blowing unit 48 when viewed from above in the vertical direction Z. In the drawings, in the width direction X, the right direction when viewed from the downstream in the transporting direction Y may be referred to as a first width direction X1, and the left direction when viewed from the downstream in the transporting direction Y may be referred to as a second width direction X2. FIG. 7 is a cross-sectional view of the first air blowing unit 47 and the second air blowing unit 48 when viewed from the starting point side in the second width direction X2.

As illustrated in FIG. 6, the second air blowing unit 48 has a tubular shape and includes a second air blowing flow path 50 through which air can be blown. The second air blowing flow path 50 is included in the air blowing flow path 43. The second air blowing flow path 50 is provided extending in the width direction X. The second air blowing flow path 50 is formed by an inner wall of the second air blowing unit 48.

The second air blowing unit 48 includes an opening 51. The opening 51 is provided at one end portion 48A of the second air blowing unit 48. The opening 51 is included in the second air blowing flow path 50. The opening 51 is exposed toward the second width direction X2. The opening 51 draws in outside air from the outside of the housing 12 via a flow path (not illustrated).

The second air blowing unit 48 includes a communication port 52. The communication port 52 is provided at another end portion 48B of the second air blowing unit 48. The communication port 52 is included in the second air blowing flow path 50. The communication port 52 is exposed toward the upstream in the transport direction Y in the second air blowing unit 48. The communication port 52 is located in the first overlapping region DA1. The communication port 52 allows the second air blowing flow path 50 to communicate with a first air blowing flow path 63 of the first air blowing unit 47.

The air blowing unit 24 includes an airflow generation unit 53. The airflow generation unit 53 may be located downstream of the opening 51 in the second air blowing flow path 50. The airflow generation unit 53 generates airflow in response to driving. The airflow generation unit 53 may be air blowing fan. The airflow generation unit 53 is provided to blow air toward the first width direction X1. The airflow generation unit 53 draws in air from the opening 51 into the second air blowing flow path 50 and blows the air in the second air blowing flow path 50 from the communication port 52.

The air blowing unit 24 includes a heater 54. The heater 54 may be located downstream of the airflow generation unit 53 in the second air blowing flow path 50 of the second air blowing unit 48. The heater 54 is a positive temperature coefficient (PTC) heater. The PTC heater is a heater that generates heat when an electric current flows therethrough, and can maintain a certain temperature when the temperature rises to the certain temperature. In addition, the PTC heater is a heater capable of realizing miniaturization. In this manner, the heater 54 increases the temperature of the air in the second air blowing flow path 50. Accordingly, the heater 54 promotes drying of the medium after printing M.

In the second air blowing unit 48, an inner wall 55 on the downstream in the transport direction Y has an arc shape at the other end portion 48B of the second air blowing unit 48. The second air blowing flow path 50 is formed such that the second air blowing flow path 50 becomes narrower toward the first width direction X1 when viewed in the width direction X. That is, in the second air blowing unit 48, the air from the opening 51 is blown toward the first width direction X1 along the second air blowing flow path 50 by the driving of the airflow generation unit 53, but the air is guided to the upstream in the transport direction Y by the inner wall 55.

As illustrated in FIGS. 6 and 7, the second air blowing unit 48 includes an inclined surface 56. The inclined surface 56 is provided at a bottom portion of the inner wall of the other end portion 48B of the second air blowing unit 48. The inclined surface 56 is inclined descending to the communication port 52 toward the upstream in the transport direction Y at the other end portion 48B of the second air blowing unit 48. That is, the second air blowing flow path 50 is configured to be inclined downward in the vertical direction Z toward the communication port 52. Thus, the second air blowing flow path 50 guides the air to descend along the inclined surface 56 to the communication port 52. The inclined surface 56 is inclined in two stages, but is not limited thereto.

As will be described in detail later, the second air blowing flow path 50 communicates with the first air blowing flow path 63 of the first air blowing unit 47 via the communication port 52. Thus, the airflow generation unit 53 can blow the air in the second air blowing flow path 50 to the first air blowing unit 47 via the communication port 52. In this manner, it can be said that the airflow generation unit 53 generates airflow in the first air blowing unit 47 and the second air blowing unit 48.

The second air blowing unit 48 is configured such that the minimum cross-sectional area of the second air blowing flow path 50 when viewed in the width direction X is 30% or more of the maximum cross-sectional area of the second air blowing flow path 50 when viewed in the width direction X, and more preferably 50% or more of the maximum cross-sectional area of the second air blowing flow path 50 when viewed in the width direction X. In addition, the second air blowing unit 48 is configured such that the cross-sectional area of the communication port 52 when viewed in the transport direction Y is 20% or more of the maximum cross-sectional area of the second air blowing flow path 50 when viewed in the width direction X. Further, the second air blowing flow path 50 has a greater cross-sectional area for blowing air than the first air blowing flow path 63.

Configuration of First Air Blowing Unit 47

Figure 8:
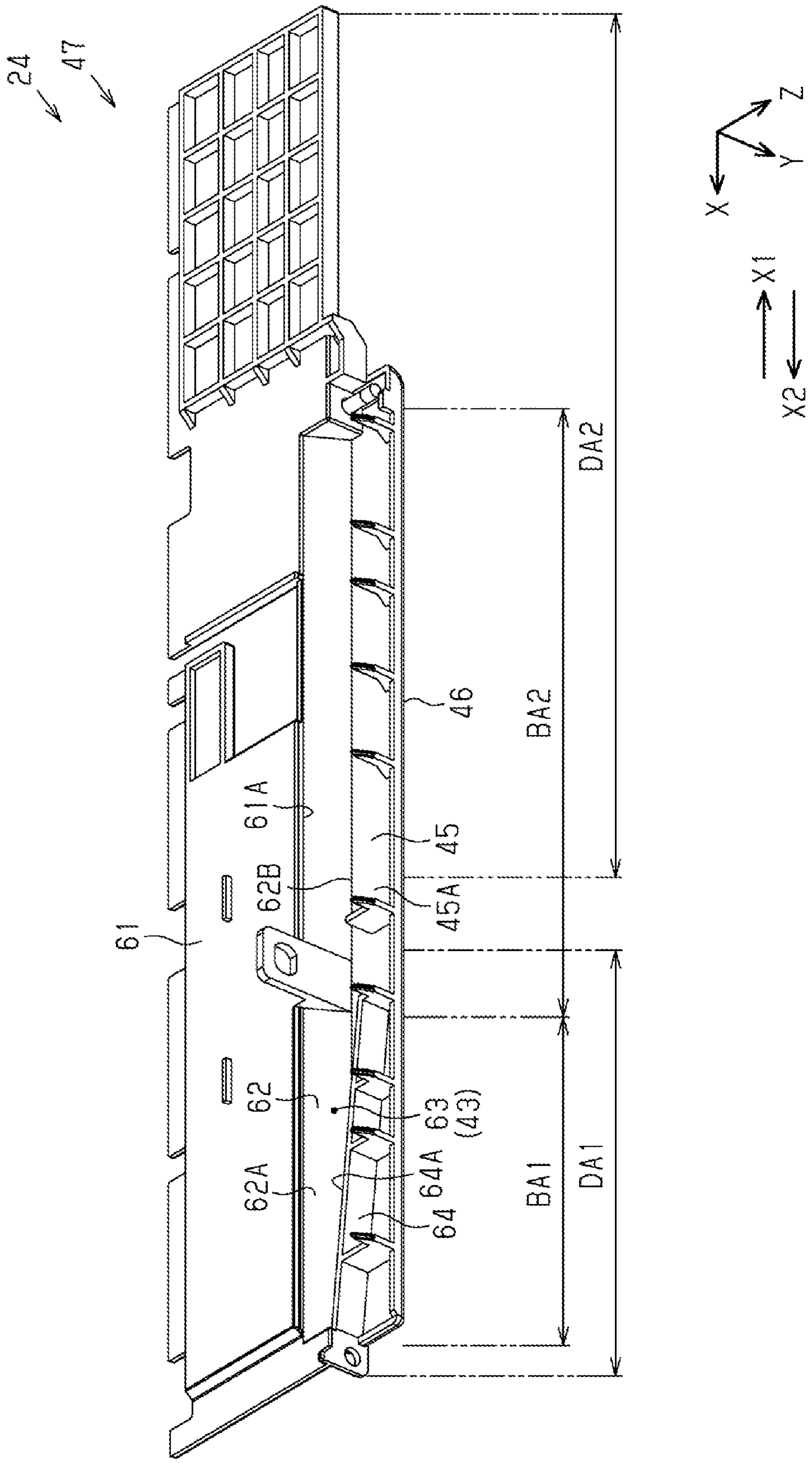
FIG. 8 is a perspective view illustrating the first air blowing unit.
Figure 9:
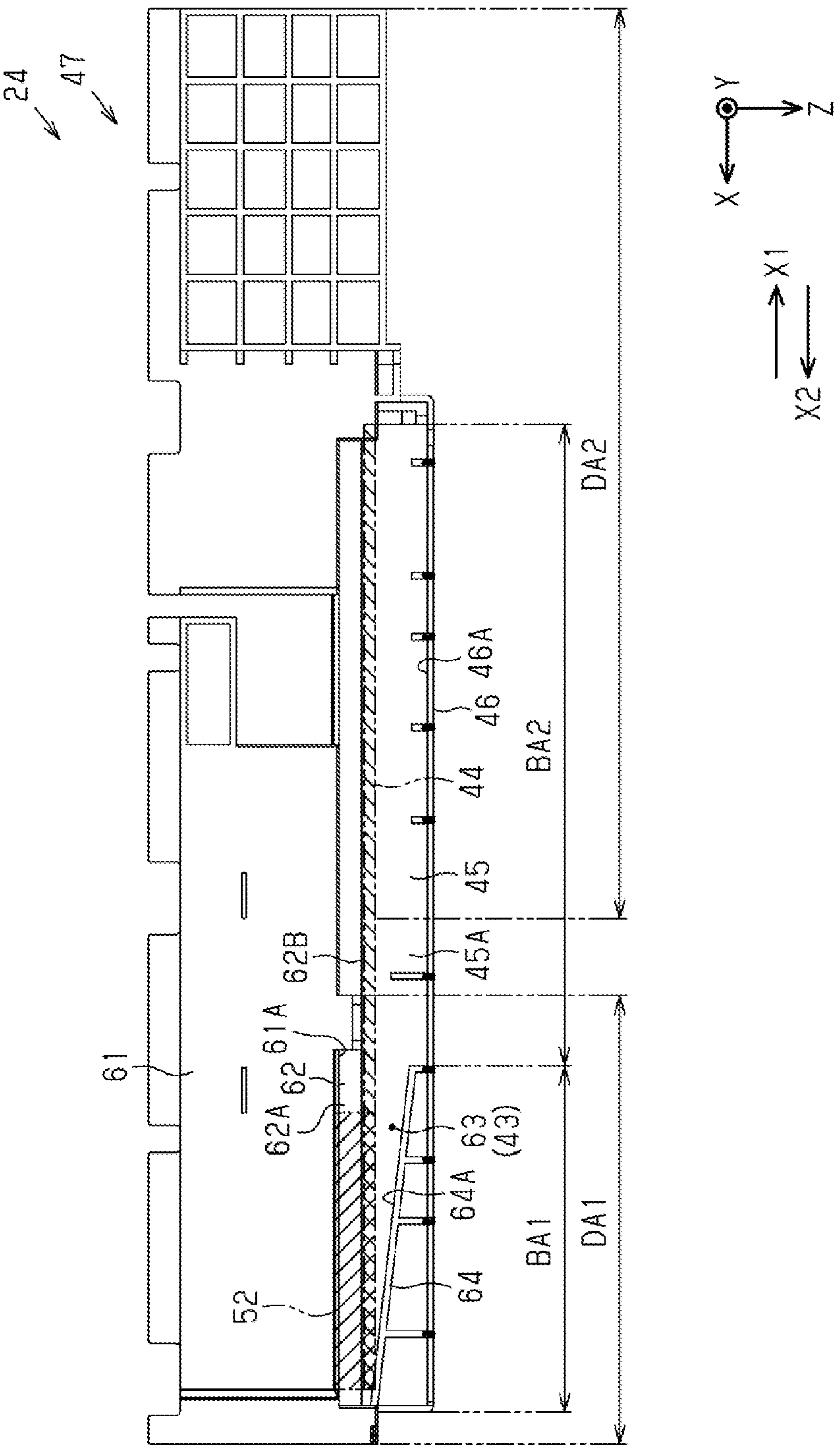
FIG. 9 is a front view illustrating the first air blowing unit.
Figure 10:
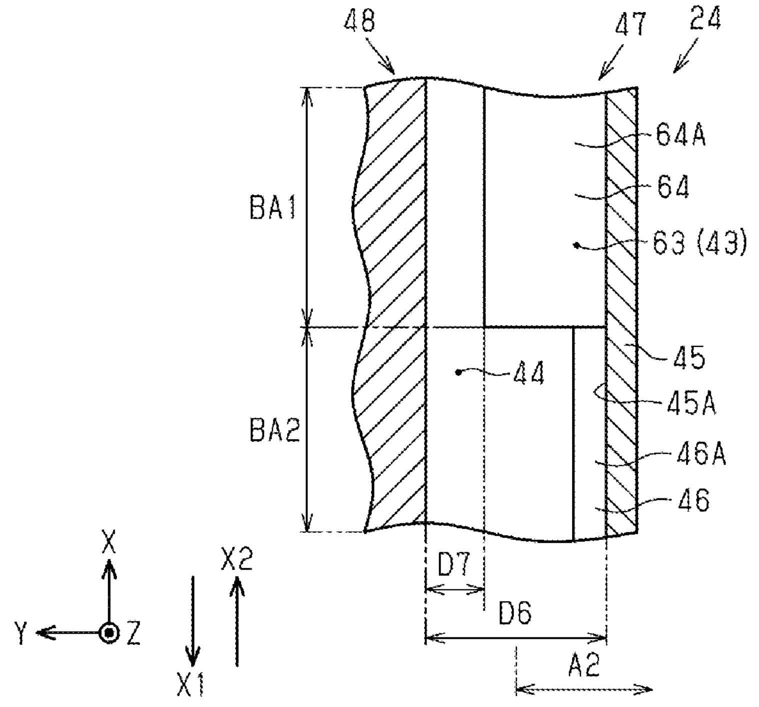
FIG. 10 is a cross-sectional view illustrating the first air blowing unit and the second air blowing unit.

Next, the first air blowing unit 47 will be described with reference to FIGS. 7 to 10. FIG. 8 is a perspective view of the first air blowing unit 47. FIG. 9 is a front view of the first air blowing unit 47 when viewed from the downstream in the transport direction Y. In FIG. 9, in order to facilitate understanding of the disclosure, the air blowing port 44 and the communication port 52 are indicated by oblique lines having different angles from each other. FIG. 10 is a cross-sectional view of the first air blowing unit 47 and the second air blowing unit 48 when viewed from above in the vertical direction Z.

As illustrated in FIGS. 7 to 9, the first air blowing unit 47 is provided extending in the width direction X. Specifically, the first air blowing unit 47 includes a main body portion 61. The main body portion 61 has a thin plate shape. The main body portion 61 is provided along a plane including the width direction X and the vertical direction Z. The main body portion 61 is provided extending in the width direction X. The main body portion 61 includes a lower end portion 61A and a contact surface 61B. In the first overlapping region DA1, the main body portion 61 is provided such that the contact surface 61B located downstream of the lower end portion 61A in the transport direction Y comes into contact with the outer wall of the second air blowing unit 48.

The first air blowing unit 47 includes an inclined portion 62. The inclined portion 62 has a thin plate shape. The inclined portion 62 is provided extending in the width direction X. The inclined portion 62 is provided at a lower end portion 61A of the main body portion 61. The inclined portion 62 is inclined descending toward the upstream in the transport direction Y.

The inclined portion 62 includes an inclined surface 62A. The inclined surface 62A is a surface on the downstream in the transport direction Y. In the first overlapping region DA1, the inclined portion 62 is provided such that the inclined surface 62A is located upstream from the communication port 52 in the transport direction Y. As a result, the inclined portion 62 guides the air from the communication port 52 of the second air blowing unit 48 toward the lower side in the vertical direction Z.

The first air blowing unit 47 includes the above-described partition wall 45. The partition wall 45 is provided extending in the width direction X. The partition wall 45 is provided at a lower end portion 62B of the inclined portion 62. The partition wall 45 includes the above-described protruding portion 46. The protruding portion 46 is provided extending in the width direction X.

The first air blowing unit 47 includes the first air blowing flow path 63 through which air can be blown. The first air blowing flow path 63 is included in the air blowing flow path 43. The first air blowing flow path 63 is provided extending in the width direction X. The first air blowing flow path 63 is formed by at least the inclined surface 62A of the inclined portion 62 and the first surface 45A of the partition wall 45. The first air blowing flow path 63 communicates with the second air blowing flow path 50 via the communication port 52. The first air blowing flow path 63 communicates with the air blowing port 44. In this manner, the first air blowing flow path 63 can blow the air from the second air blowing flow path 50 to the air blowing port 44.

The first air blowing unit 47 includes the above-described air blowing port 44. The air blowing port 44 is formed by at least the first surface 45A of the partition wall 45. The air blowing port 44 is provided extending in the width direction X. The air blowing port 44 is also formed by a guide portion 64 described later and the outer wall of the second air blowing unit 48. The air blowing port 44 communicates with the first air blowing flow path 63.

The first air blowing unit 47 may include the guide portion 64. The guide portion 64 is provided in a first air blowing region BA1 in the width direction X. The guide portion 64 is not provided in a second air blowing region BA2 in the width direction X. The first air blowing region BA1 communicates with the communication port 52. The second air blowing region BA2 does not communicate with the communication port 52. The first air blowing region BA1 is a region closer to the communication port 52 than the second air blowing region BA2 in the width direction X.

The guide portion 64 protrudes downstream in the transport direction Y from the first surface 45A of the partition wall 45. The guide portion 64 is provided in the first air blowing flow path 63. The guide portion 64 is provided extending in the width direction X. The guide portion 64 includes an upper surface 64A. The upper surface 64A of the guide portion 64 is located below the communication port 52 in the vertical direction Z. The upper surface 64A of the guide portion 64 guides the air from the communication port 52 to the first width direction X1. Thus, the guide portion 64 guides the air from the communication port 52 to the first width direction X1.

In the width direction X, the guide portion 64 is inclined descending as the distance from the communication port 52 increases. That is, the guide portion 64 is inclined to approach the medium after printing M as the distance from the communication port 52 in the width direction X increases. As a result, the guide portion 64 guides the air from the communication port 52 downward in the vertical direction Z as the distance from the communication port 52 in the width direction X increases.

As illustrated in FIG. 10, in a partial region of the second air blowing region BA2 where the guide portion 64 is not located, the first surface 45A of the partition wall 45 and the second air blowing unit 48 are separated by a sixth distance D6. Note that the second air blowing unit 48 may not be disposed in a partial region of the second air blowing region BA2 where the guide portion 64 is not located. On the other hand, in the first air blowing region BA1 where the guide portion 64 is located, the end portion of the guide portion 64 and the second air blowing unit 48 are separated by a seventh distance D7. The seventh distance D7 is smaller than the sixth distance D6. In this manner, the guide portion 64 has a function of adjusting the blowing amount of air blown downward in the vertical direction Z from the communication port 52.

Configuration of Exhaust Unit 49

Figure 11:
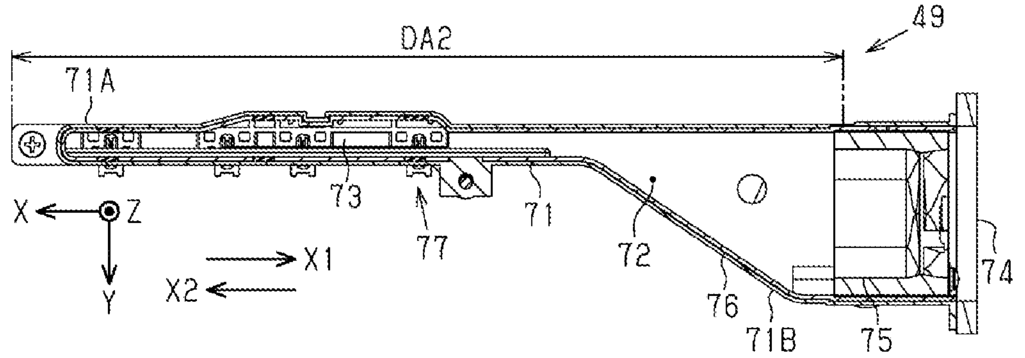
FIG. 11 is a cross-sectional view illustrating an exhaust unit.
Figure 12:
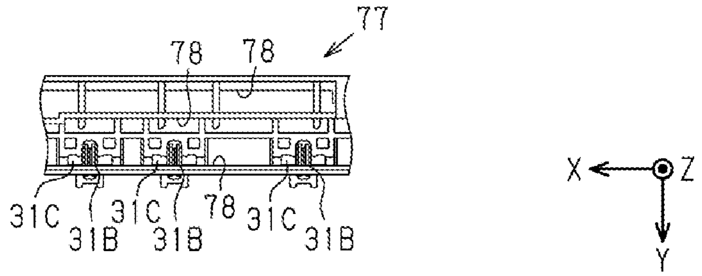
FIG. 12 is a top view illustrating a holding unit.

Next, the exhaust unit 49 will be described with reference to FIGS. 11 and 12. FIG. 11 is a cross-sectional view of the exhaust unit 49 when viewed from above in the vertical direction Z. FIG. 12 is a top view of a holding unit 77 when viewed from above in the vertical direction Z.

As illustrated in FIG. 11, the exhaust unit 49 includes a third air blowing unit 71. The third air blowing unit 71 is provided extending in the width direction X. The third air blowing unit 71 can blow air.

The third air blowing unit 71 has a tubular shape and includes an exhaust flow path 72 through which air can be exhausted. The exhaust flow path 72 is provided extending in the width direction X. The exhaust flow path 72 is formed by an inner wall of the third air blowing unit 71.

The third air blowing unit 71 includes an air intake port 73. The air intake port 73 is provided at one end portion 71A of the third air blowing unit 71. The air intake port 73 is included in the exhaust flow path 72. The air intake port 73 is exposed downward in the vertical direction Z in the third air blowing unit 71. In particular, when the medium after printing M is transported along the transport path 20, the air intake port 73 is exposed toward the medium after printing M. That is, the air intake port 73 is configured to be able to intake the air between the exhaust unit 49 and the medium after printing M into the exhaust flow path 72.

The air intake port 73 is located downstream of the air blowing port 44 in the transport direction Y. Therefore, when the air intake port 73 is located downstream from the air blowing port 44 in the transport direction Y, the air from the air blowing port 44 can be less likely to move upstream in the transport direction Y than when the air intake port 73 is located upstream from the air blowing port 44 in the transport direction Y.

The third air blowing unit 71 includes an opening 74. The opening 74 is provided at another end portion 71B of the third air blowing unit 71. The opening 74 is included in the exhaust flow path 72. The opening 74 is exposed toward the first width direction X1. The opening 74 exhausts the air in the exhaust flow path 72 to the outside of the housing 12 via a flow path (not illustrated).

The exhaust unit 49 includes an exhaust flow generation unit 75. The exhaust flow generation unit 75 may be located upstream of the opening 74 in the exhaust flow path 72. The exhaust flow generation unit 75 generates airflow in response to driving. The exhaust flow generation unit 75 may be air blowing fan. The exhaust flow generation unit 75 is provided to blow air toward the first width direction X1. The exhaust flow generation unit 75 sucks air into the exhaust flow path 72 from the air intake port 73 and exhausts the air in the exhaust flow path 72 from the opening 74. In this manner, the exhaust flow generation unit 75 generates airflow in the third air blowing unit 71.

In the third air blowing unit 71, an inner wall 76 on the downstream in the transport direction Y is inclined downstream in the transport direction Y from the one end portion 71A side to the other end portion 71B side of the third air blowing unit 71. The exhaust flow path 72 is formed such that the exhaust flow path 72 becomes wider toward the other end portion 71B of the third air blowing unit 71 when viewed in the width direction X. In this manner, the third air blowing unit 71 exhausts the air from the air intake port 73 along the exhaust flow path 72 by driving the exhaust flow generation unit 75.

Configuration of Holding Unit 77

The printing apparatus 11 includes the holding unit 77. The holding unit 77 is disposed along the cutting unit 25 at least in the width direction X, and is located below the exhaust unit 49 in the vertical direction Z. In particular, the holding unit 77 is located at least below the air intake port 73 in the vertical direction Z. When the medium after printing M is transported on the transport path 20, the holding unit 77 is located above the medium after printing M in the vertical direction Z. That is, the holding unit 77 is located between the air intake port 73 and the medium after printing M.

As illustrated in FIG. 12, the holding unit 77 holds the driven roller 31B of the first roller pair 31. The driven roller 31B is rotatably attached to a rotation shaft 31C. The holding unit 77 rotatably holds the driven roller 31B by holding the rotation shaft 31C.

The driven roller 31B is located downstream from the printing head 35 in the transport direction Y and upstream from the cutting unit 25 in the transport direction Y. Similarly to the driven roller 31B, the holding unit 77 is located downstream from the printing head 35 in the transport direction Y and upstream from the cutting unit 25 in the transport direction Y.

The driving roller 31A and the driven roller 31B are an example of rollers for transporting the medium after printing M. The driving roller 31A and the driven roller 31B press the medium after printing M to be cut by the cutting unit 25.

The holding unit 77 includes a through hole 78. The through hole 78 penetrates in the vertical direction Z. That is, at a position between the air intake port 73 and the medium after printing M, the through hole 78 faces the air intake port 73 and the medium after printing M. The through hole 78 is formed not to hold the driven roller 31B and the rotation shaft 31C but to suppress decrease in the amount of intake air to the air intake port 73. The number of the through holes 78 may be one or more.

Operation of First Exemplary Embodiment

The operation of the first exemplary embodiment will be described.

As illustrated in FIG. 5, the second air blowing unit 48 is located between the cutting unit 25 and the housing 12 in the width direction X. The exhaust unit 49 is located between the cutting unit 25 and the housing 12 in the width direction X at a position opposite to the second air blowing unit 48 across the cutting unit 25.

The air blowing unit 24 is located downstream of the printing head 35 of the carriage 34 and upstream of the cutting unit 25 in the transport direction Y. In particular, the first air blowing unit 47 is located downstream of the printing head 35 of the carriage 34 and upstream of the cutting unit 25 in the transport direction Y.

The first air blowing unit 47 is located overlapping with a part of the movement region MA of the carriage 34 in plan view. Specifically, the first air blowing unit 47 is located overlapping with a part of the second region A2 in the movement region MA of the carriage 34 in plan view. In such a case, as illustrated in FIG. 4, a part of the air blowing port 44 is located between the second region A2 of the carriage 34 and the medium after printing M.

In this manner, it is possible to dispose the first air blowing unit 47 at a position close to the carriage 34 in the transport direction Y. In particular, since the second air blowing unit 48 and the exhaust unit 49 are located between the cutting unit 25 and the housing 12 in the width direction X, it is possible to dispose the first air blowing unit 47 at a position close to the carriage 34 in the transport direction Y. In addition, it is possible to dispose the cutting unit 25 at a position close to the carriage 34 in the transport direction Y.

As illustrated in FIG. 6, the airflow is generated by driving the airflow generation unit 53. Specifically, when the airflow generation unit 53 is driven, air from the outside of the housing 12 flows into the second air blowing flow path 50 through the opening 51. The air that has flowed into the second air blowing flow path 50 through the opening 51 flows along the second air blowing flow path 50 in the first width direction X1. The temperature of the air flowing through the second air blowing flow path 50 is increased by the heater 54 in order to promote drying of the medium after printing M.

When the air that has flowed into the second air blowing flow path 50 flows to the first width direction X1, the air blowing direction is changed to the upstream in the transport direction Y along the inner wall 55 on the downstream in the transport direction Y. Furthermore, when the air that has flowed into the second air blowing flow path 50 flows toward the first width direction X1, the air blowing direction is changed to the lower side in the vertical direction Z along the inclined surface 56. Accordingly, in the second air blowing flow path 50, the air blowing direction of the air flowing in the first width direction X1 is changed to the upstream in the transport direction Y and to the lower side in the vertical direction Z. Then, the air in the second air blowing flow path 50 is blown to the first air blowing flow path 63 via the communication port 52 located upstream of the second air blowing flow path 50 in the transport direction Y.

Since a part of the second air blowing unit 48 is located between the cutting unit 25 and the housing 12 in the width direction X, the cross-sectional area through which the air is blown can be made greater in the second air blowing flow path 50 than in the first air blowing flow path 63. Further, in the second air blowing flow path 50 and the communication port 52, the cross-sectional area through which the air is blown becomes small on the downstream through which the air is blown. In this case, by adjusting the cross-sectional areas of the second air blowing flow path 50 and the communication port 52 through which the air is blown, the pressure loss of the air to the first air blowing flow path 63 is not excessively increased.

As illustrated in FIG. 9, in the first air blowing flow path 63, the air flowing from the second air blowing flow path 50 through the communication port 52 flows in the air blowing direction to the upstream in the transport direction Y and to the lower side in the vertical direction Z, although in the first width direction X1. The air blowing direction of the air that has flowed into the first air blowing flow path 63 is further changed to the lower side in the vertical direction Z by the inclined surface 62A of the inclined portion 62.

In this case, in the first air blowing region BA1 close to the communication port 52, the blowing amount of the air blown from the air blowing port 44 can be reduced by the guide portion 64, thereby increasing the blowing amount of the air blown in the first width direction X1. In addition, in the first air blowing region BA1 close to the communication port 52, the air that has flowed into the first air blowing flow path 63 is guided downward in the vertical direction Z along the upper surface 64A of the guide portion 64 as it travels in the first width direction X1. In the second air blowing region BA2 away from the communication port 52, the guide portion 64 is not provided, and the air is blown from the air blowing port 44.

In this manner, the blowing amount of the air blown from the air blowing port 44 can be adjusted in the first air blowing region BA1 close to the communication port 52 and in the second air blowing region BA2 away from the communication port 52. For example, when the blowing amount of air blown from the air blowing port 44 becomes too large in the first air blowing region BA1, the blowing amount of air blown from the air blowing port 44 becomes small in the second air blowing region BA2. On the other hand, when the blowing amount of the air blown from the air blowing port 44 becomes too small in the first air blowing region BA1, the blowing amount of the air blown from the air blowing port 44 becomes large in the second air blowing region BA2. By providing the guide portion 64 in this manner, it is possible to equalize the blowing amount of the air blown from the air blowing port 44 in the first width direction X1.

The air from the air blowing port 44 is blown downward in the vertical direction Z along the first surface 45A of the partition wall 45. The partition wall 45 is provided extending downward in the vertical direction Z on the upstream of the air blowing port 44 in the transport direction Y. Therefore, the air from the air blowing port 44 is less likely to flow to the upstream in the transport direction Y than the air blowing port 44.

In addition, at the lower end portion 45B of the partition wall 45, the air from the air blowing port 44 is less likely to flow to the upstream in the transport direction Y than the air blowing port 44 due to the protruding portion 46. Accordingly, the air from the air blowing port 44 does not greatly affect the printing head 35 on the upstream of the air blowing port 44 in the transport direction Y.

The first air blowing unit 47 is located downstream from the printing head 35 and upstream from the cutting unit 25 in the transport direction Y. Therefore, by making the cross-sectional area through which the air is blown smaller in the first air blowing flow path 63 than in the second air blowing flow path 50, it is possible to achieve space saving for the positions of the carriage 34, the air blowing unit 24, and the cutting unit 25.

As illustrated in FIG. 11, at the exhaust unit 49, airflow is generated by driving the exhaust flow generation unit 75. Specifically, by driving the exhaust flow generation unit 75, the air between the exhaust unit 49 and the medium after printing M flows into the exhaust flow path 72 via the air intake port 73. In this case, although the holding unit 77 is located between the air intake port 73 and the medium after printing M, the air between the exhaust unit 49 and the medium after printing M flows into the exhaust flow path 72 via the air intake port 73 via the through hole 78 of the holding unit 77, etc.

The air that has flowed into the exhaust flow path 72 via the air intake port 73 flows to the first width direction X1 along the exhaust flow path 72. When the air that has flowed into the exhaust flow path 72 flows to the first width direction X1, the cross-sectional area through which the air is blown along the inner wall 76 on the downstream in the transport direction Y increases, and the air flows out from the opening 74 and is exhausted to the outside of the housing 12.

Effects of First Exemplary Embodiment

Effects of the first exemplary embodiment will be described.

The air blowing unit 24 is provided such that a part of the air blowing port 44 is located between the carriage 34 and the medium after printing M at a position where the part of the air blowing port 44 overlaps with a part of a movement region MA of the carriage 34 in plan view. Therefore, it is possible to bring the air blowing port 44 close to the carriage 34. That is, it is possible to bring the air blowing unit 24 close to the carriage 34. Accordingly, it is possible to realize space saving in the transport direction Y with respect to the positions of the air blowing unit 24 and the carriage 34. Therefore, it is possible to realize space saving of the printing apparatus 11.

(2) In addition to this, the air blowing unit 24 extends in the width direction X and is immovably provided. In this manner, it is possible to blow air to the medium after printing M without mounting the air blowing unit 24 on the carriage 34 that is movable in the width direction X. Therefore, it is possible to realize space saving of the printing apparatus 11 without affecting the movement of the carriage 34 in the width direction X.

(3) The air blowing port 44 is provided at a position farther from the reference plane RP than the nozzle surface 36 is. Therefore, the air blown from the air blowing port 44 is unlikely to flow upstream in the transport direction Y. Accordingly, it is possible to realize space saving of the printing apparatus 11 without greatly affecting the ejection of the liquid from the printing head 35 on the upstream in the transport direction Y.

(4) The carriage 34 includes the first region A1 in which the printing head 35 is mounted and the second region A1 located downstream from the first region A2 in the transport direction Y. The second region A2 is located farther from the reference plane RP than the first region A1 is. A part of the air blowing port 44 is located between the second region A2 of the carriage 34 and the medium after printing M. Therefore, by providing a distance between the second region A2 in which the printing head 35 is not mounted and the reference surface RP, it is possible to provide a space where a part of the air blowing port 44 is located between the second region A2 and the medium after printing M. In this manner, by bringing the air blowing port 44 close to the carriage 34 in the second region A2 in which the printing head 35 is not mounted, it is possible to realize space saving in the transport direction Y with respect to the positions of the air blowing unit 24 and the carriage 34. Therefore, it is possible to realize space saving of the printing apparatus 11.

(5) The air blowing unit 24 includes the partition wall 45 that blocks the air blown from the air blowing port 44. The partition wall 45 is provided upstream from the air blowing port 44 in the transport direction Y to extend at least from the air blowing port 44 toward the medium after printing M. Therefore, the air blown from the air blowing port 44 is unlikely to flow upstream in the transport direction Y. Accordingly, it is possible to realize space saving of the printing apparatus 11 without greatly affecting the ejection of the liquid from the printing head 35 on the upstream in the transport direction Y.

(6) Although the air whose temperature has been increased by the heater 54 is blown from the air blowing port 44, the air blown from the air blowing port 44 is unlikely to flow upstream in the transport direction Y. Accordingly, it is possible to suppress the printing head 35 from being warmed by the air blown from the air blowing port 44 on the upstream in the transport direction Y. Therefore, it is possible to realize space saving of the printing apparatus 11 without largely affecting the printing head 35.

(7) The partition wall 45 includes the protruding portion 46 that protrudes downstream in the transport direction Y between the air blowing port 44 and the medium after printing M. Therefore, the air blown from the air blowing port 44 is guided to the downstream in the transport direction Y by the protruding portion 46, and thus the air is further less likely to flow to the upstream in the transport direction Y. Accordingly, it is possible to realize space saving of the printing apparatus 11 without greatly affecting the ejection of the liquid from the printing head 35 on the upstream in the transport direction Y.

(8) The protruding portion 46 is provided at a position farther from the reference plane RP than the nozzle surface 36 is. Therefore, the air blown from the air blowing port 44 is guided to the downstream in the transport direction Y by the protruding portion 46 at a position farther from the reference plane RP than the nozzle surface 36 is, and thus the air is further less likely to flow to the upstream in the transport direction Y. Accordingly, it is possible to realize space saving of the printing apparatus 11 without greatly affecting the ejection of the liquid from the printing head 35 on the upstream in the transport direction Y.

(9) The air blowing unit 24 includes the first air blowing unit 47 having the first air blowing flow path 63 and the second air blowing unit 48 having the second air blowing flow path 50. The second air blowing flow path 50 has a greater cross-sectional area for blowing air than the first air blowing flow path 63, and can blow air to the first air blowing flow path 63 via the communication port 52. The first air blowing unit 47 is located downstream of the printing head 35 and upstream of the cutting unit 25 in the transport direction Y, and a part of the second air blowing unit 48 is located between the housing 12 and the cutting unit 25 in the width direction X. The first air blowing unit 47 and the second air blowing unit 48 are provided at positions where they face each other in the transport direction Y in the first overlapping region DA1 along the width direction X, and the communication port 52 that communicates the second air blowing flow path 50 with the first air blowing flow path 63 is located in the first overlapping region DA1. Therefore, the first air blowing unit 47 is located downstream of the printing head 35 and upstream of the cutting unit 25 in the transport direction Y, and it is possible to bring the carriage 34, the air blowing unit 24, and the cutting unit 25 close to each other in the transport direction Y. Therefore, it is possible to realize space saving of the printing apparatus 11.

(10) In addition to this, the second air blowing unit 48 having a greater cross-sectional area for blowing air than the first air blowing flow path 63 is located between the housing 12 and the cutting unit 25 in the width direction X. As a result, it is possible to realize space saving of the printing apparatus 11 while securing the blowing amount of the air blown to the first air blowing flow path 63.

(11) In addition to this, in the first overlapping region DA1 along the width direction X, the first air blowing unit 47 and the second air blowing unit 48 face each other in the transport direction Y, and air can be blown from the second air blowing flow path 50 to the first air blowing flow path 63 via the communication port 52. Thus, the pressure loss from the second air blowing flow path 50 to the first air blowing flow path 63 is not excessively increased. Therefore, it is possible to realize space saving of the printing apparatus 11 without excessively increasing the pressure loss for blowing the air from the air blowing port 44.

(12) The second air blowing unit 48 is configured such that the cross-sectional area of the communication port 52 is 20% or more of the maximum cross-sectional area of the second air blowing flow path 50 when viewed in the width direction X. Therefore, the pressure loss from the second air blowing flow path 50 to the first air blowing flow path 63 is not excessively increased. Therefore, it is possible to realize space saving of the printing apparatus 11 without excessively increasing the pressure loss for blowing the air from the air blowing port 44.

(13) The second air blowing unit 48 is configured such that the minimum cross-sectional area of the second air blowing flow path 50 when viewed in the width direction X is 30% or more of the maximum cross-sectional area of the second air blowing flow path 50 when viewed in the width direction X. Therefore, the pressure loss from the second air blowing flow path 50 is not excessively increased. Therefore, it is possible to realize space saving of the printing apparatus 11 without excessively increasing the pressure loss for blowing the air from the air blowing port 44.

(14) The heater 54 that increases the temperature of the air in the second air blowing path 50 is a PTC heater and is located at the second air blowing path 50. Therefore, it is possible to reduce the number of components and reduce the installation region of the heater 54, and it is possible to realize space saving of the printing apparatus 11. In addition, the heater 54 can be easily controlled.

(15) The second air blowing flow path 50 is configured to be inclined downward in the vertical direction Z toward the communication port 52. Therefore, in the second air blowing flow path 50, the air can be blown downward in the vertical direction Z toward the communication port 52 communicating with the first air blowing flow path 63. As a result, it is possible to smoothly create airflow downward in the vertical direction Z in the first air blowing flow path 63. Therefore, it is possible to realize space saving of the printing apparatus 11 without excessively increasing the pressure loss for blowing the air from the air blowing port 44.

(16) The first air blowing unit 47 includes the guide portion 64 that guides the air from the communication port 52 in the first air blowing flow path 63, and the guide portion 64 extends in the width direction X and is inclined to approach the medium after printing M as the distance from the communication port 52 in the width direction X increases. Therefore, the air from the communication port 52 is guided in the width direction X in the first air blowing flow path 63. In addition, in the first air blowing flow path 63, the air from the communication port 52 is guided to approach the medium after printing M as the distance from the communication port 52 in the width direction X increases. Accordingly, in the width direction X, the blowing amount of the air from the communication port 52 can be equalized, and further, the pressure loss in the first air blowing flow path 63 can be reduced. Therefore, it is possible to realize space saving of the printing apparatus 11 without excessively increasing the pressure loss for blowing the air from the air blowing port 44.

(17) When liquid is ejected from the printing head 35 onto the medium M, a relatively large amount of moisture is contained in the air at the print position P1 and upstream from the print position P1 in the transport direction Y. In addition, the medium after printing M also contains moisture. In such a situation, the exhaust unit 49 can promote drying of the medium after printing M by exhausting the air between the exhaust unit 49 and the medium after printing M. In addition, mist generated when the liquid is ejected from the printing head 35 can be exhausted to the outside of the housing 12 together with the air.

The exhaust unit 49 is provided between the housing 12 and the cutting unit 25 at a position opposite to the second air blowing unit 48 across the cutting unit 25. The first air blowing unit 47 and the exhaust unit 49 are provided at positions where they face each other in the transport direction Y in the second overlapping region DA2 along the width direction X. The exhaust unit 49 is located between the housing 12 and the cutting unit 25 in the width direction X at a position opposite to the second air blowing unit 48 across the cutting unit 25. Accordingly, it is possible to efficiently dry the medium after printing M, and to realize space saving of the printing apparatus 11.

(18) The holding unit 77 that holds the driven roller 31B of the first roller pair 31 is located downstream from the printing head 35 in the transport direction Y and upstream from the cutting unit 25 in the transport direction Y. The holding unit 77 is located between the air intake port 73 of the exhaust unit 49 and the medium after printing M, and includes the through hole 78 provided between the air intake port 73 and the medium after printing M. Therefore, even in a case where the holding unit 77 is located between the air intake port 73 of the exhaust unit 49 and the medium after printing M, it is possible to suck the air between the exhaust unit 49 and the medium after printing M from the air intake port 73 via the through hole 78 provided in the holding unit 77. Therefore, it is possible to realize space saving of the printing apparatus 11 without reducing the efficiency of exhausting the air between the exhaust unit 49 and the medium after printing M.

Modified Examples

The present embodiment described above may be modified as follows. The present embodiment and modified examples thereof to be described below may be implemented in combination within a range in which a technical contradiction does not arise.

- The cutting unit 25 is employed as an example of a processing unit that processes the medium after printing M, but the disclosure is not limited thereto. For example, a stacker may be used as an example of the processing unit. The medium M to be discharged can be placed at the stacker. In this case, the stacker is configured to be slidable, and may be pulled out to the outside of the housing 12 when in use, and may be accommodated inside the housing 12 when not in use. An example of the processing unit may be an image reading unit that reads an image from the medium M. That is, the processing unit may perform processing related to the medium M, and the medium may be the medium after printing M or the medium M not related to printing.
- The through hole 78 for communication may not be provided at the holding unit 77. The holding unit 77 may not be provided between the exhaust unit 49 and the medium after printing M.
- The support portion 22 may include the support surface 22A having a recessed portion. In this case, the support surface 22A may have a surface that supports the medium M. In addition, the reference surface RP may include at least a part of the surface of the support surface 22A, and it is preferable that the support surface 22A include a surface supporting the medium M.
- Although the region A0 of the carriage 34 is divided into three regions, without being limited thereto, the region A0 may be divided into two regions or four or more regions.
- The second region A2 may or may not be adjacent to the first region A1 as long as the second region A2 is located downstream from the first region A1 in the transport direction Y in which the nozzle surface 36 is provided.
- The second region A2 may be an region in which the printing head 35 is not mounted, and may be, for example, an region in which the carriage motor 38 is mounted.
- A part of the second air blowing unit 48 may be located at a position where the part of the second air blowing unit 48 overlaps with the first air blowing unit 47 in the transport direction Y. That is, a part of the second air blowing unit 48 may be located between the housing 12 and the first air blowing unit 47 in the width direction X.
- The second air blowing unit 48 may include the communication port in a region different from the first overlapping region DA1. As a specific example, when a part of the second air blowing unit 48 is located between the housing 12 and the first air blowing unit 47 in the width direction X of the first air blowing unit 47, the second air blowing unit 48 may include the communication port in a surface of the second air blowing unit 48 facing the first air blowing unit 47 in the width direction X, in addition to the first overlapping region DA1. At this time, the communication port may be formed continuously or may be divided into a plurality of parts.
- The entire second air blowing unit 48 may be located between the housing 12 and the cutting unit 25 in the width direction X. That is, a part or all of the second air blowing unit 48 may be located between the housing 12 and the cutting unit 25 in the width direction X.

The airflow generation unit 53 may be provided outside the second air blowing flow path 50. In this case, the second air blowing unit 48 may take in the air from the airflow generation unit 53 through the opening 51.

The heater 54 may be provided outside the second air blowing flow path 50. The heater 54 may be provided upstream from the airflow generation unit 53 in the direction in which the airflow flows.

The distance between the upper surface 64A of the guide portion 64 and the partition wall 45 is the same in the first air blowing region BA1. However, without being limited thereto, for example, in the first air blowing region BA1, the distance from the partition wall 45 may become shorter toward the first width direction X1.

The lower end portion 45B and the protruding portion 46 of the partition wall 45 may be at the same distance as the nozzle surface 36 or may be at a position closer than the nozzle surface 36 with respect to the reference plane RP.

The protruding portion 46 may be provided above the lower end portion 45B of the partition wall 45 in the vertical direction Z. Further, a plurality of protruding portions 46 may be provided at the partition wall 45 in the vertical direction Z.

The first air blowing unit 47 may include a communication port that communicates with the communication port 52 of the second air blowing unit 48. That is, the first air blowing unit 47 may or may not include a configuration as a communication port as long as the first air blowing unit 47 can take in the air from the communication port 52 of the second air blowing unit 48.

The air blowing port 44 may be formed by the configuration of the first air blowing unit 47 without using the configuration of the second air blowing unit 48. That is, regardless of whether or not the entire region of the air blowing port 44 is formed only by the first air blowing unit 47, the air blowing port 44 may communicate with the first air blowing flow path 63 in the first air blowing unit 47.

The medium M may not be a long medium that is wound as the roll body R. The medium M may be paper, a synthetic resin film, cloth, non-woven fabric, a laminate medium, etc.

The liquid may be arbitrarily selected as long as the liquid is capable of recording on the medium M by being attached to the medium M. For example, an ink includes various compositions such as an aqueous ink, an oil-based ink, a gel ink, a hot melt ink, or the like, including particles of a functional material made of a solid such as pigments or metal particles dissolved, dispersed or mixed in a solvent.

The printing apparatus 11 is not limited to a printer and may be a textile printing apparatus. The printing apparatus 11 may be a multifunction peripheral having a scanner mechanism and a copy function in addition to the recording function.

Supplementary Note

Hereinafter, technical concepts and effects thereof that are understood from the above-described embodiments and modified examples will be described.

(A) A transport unit configured to transport a medium in a transport direction; a support portion configured to support the medium transported by the transport unit; a printing head configured to perform printing by ejecting liquid onto the medium supported by the support portion; a carriage mounted with the printing head and configured to move in a scanning direction; and an air blowing unit configured to blow air to the medium after printing on which printing is performed by the printing head, are provided, wherein the support portion includes a support surface supporting the medium transported by the transport unit, the air blowing unit includes an air blowing flow path configured to blow air and an air blowing port configured to blow the air from the air blowing flow path to the medium after printing, the air blowing unit extends along the scanning direction of the carriage and is immovably provided, the air blowing unit is provided such that a part or all of the air blowing port is located between the carriage and the medium after printing at a position where the air blowing port overlaps with a part of a movement region of the carriage in plan view.

According to this configuration, it is possible to bring the air blowing port close to the carriage. That is, it is possible to bring the air blowing unit close to the carriage. Accordingly, it is possible to realize space saving in the transport direction of the medium with respect to the positions of the air blowing unit and the carriage. Therefore, it is possible to realize space saving of the printing apparatus.

In addition to this, the air blowing unit extends along the scanning direction of the carriage and is immovably provided. In this manner, it is possible to blow air to the medium after printing without mounting the air blowing unit on the carriage that is movable in the scanning direction. Therefore, it is possible to realize space saving of the printing apparatus without affecting the movement of the carriage in the scanning direction.

(B) The printing head may include a nozzle surface facing the support surface and a plurality of nozzles configured to eject liquid from the nozzle surface, and the air blowing port may be provided at a position farther from a plane including the support surface than the nozzle surface is.

According to this configuration, the air blown from the air blowing port is unlikely to flow upstream in the transport direction of the medium. Accordingly, it is possible to realize space saving of the printing apparatus without greatly affecting the ejection of the liquid from the printing head on the upstream in the transport direction of the medium.

(C) The printing head may include a nozzle surface facing the support surface and a plurality of nozzles configured to eject liquid from the nozzle surface, the carriage may include a first region and a second region different from the first region in plan view, the second region is located downstream from the first region in the transport direction of the medium, the printing head may be mounted in the first region without being mounted in the second region, the carriage may be provided such that the second region is located farther from a plane including the support surface than the first region is, and the air blowing unit may be provided such that a part or all of the air blowing port is located between the second region of the carriage and the medium after printing.

According to this configuration, by providing a distance between the second region in which the printing head is not mounted and the surface including the support surface, it is possible to provide a space where a part or all of the air blowing port is located between the second region and the medium after printing. In this manner, by bringing the air blowing port close to the carriage in the second region in which the printing head is not mounted, it is possible to realize space saving in the transport direction of the medium with respect to the positions of the air blowing unit and the carriage. Therefore, it is possible to realize space saving of the printing apparatus.

(D) The air blowing unit may include a partition wall configured to block the air blown from the air blowing port, and the partition wall may be provided upstream from the air blowing port in the transport direction of the medium so as to extend at least from the air blowing port toward the medium after printing.

According to this configuration, the air blown from the air blowing port is unlikely to flow upstream in the transport direction of the medium. Accordingly, it is possible to realize space saving of the printing apparatus without greatly affecting the ejection of the liquid from the printing head on the upstream in the transport direction of the medium.

(E) The partition wall may include, between the air blowing port and the medium after printing, a protruding portion protruding downstream in the transport direction of the medium.

According to this configuration, the air blown from the air blowing port is guided to the downstream in the transport direction of the medium by the protruding portion, and thus the air is further less likely to flow to the upstream in the transport direction of the medium. Accordingly, it is possible to realize space saving of the printing apparatus without greatly affecting the ejection of the liquid from the printing head on the upstream in the transport direction of the medium.

(F) The printing head may include a nozzle surface facing the support surface and a plurality of nozzles configured to eject liquid from the nozzle surface, and the protruding portion may be provided at a position farther from a plane including the support surface than the nozzle surface is.

According to this configuration, the air blown from the air blowing port is guided to the downstream in the transport direction of the medium by the protruding portion at the position further from the surface including the support surface than the nozzle surface is, and thus the air is further less likely to flow to the upstream in the transport direction of the medium. Accordingly, it is possible to realize space saving of the printing apparatus without greatly affecting the ejection of the liquid from the printing head on the upstream in the transport direction of the medium.

(G) The protruding portion may be provided at a lower end of the partition wall. According to this configuration, effects similar to (E) and (F) can be provided.

(H) A transport unit configured to transport a medium in a transport direction; a printing head configured to perform printing by ejecting liquid onto the medium transported by the transport unit; a carriage mounted with the printing head and configured to move in a scanning direction; an air blowing unit configured to blow air to the medium after printing on which printing is performed by the printing head; a processing unit configured to perform processing related to the medium; and a housing configured to accommodate the transport unit, the printing head, the carriage, the air blowing unit, and the processing unit, are provided, wherein the air blowing unit includes a first air blowing unit configured to blow air, a second air blowing unit configured to blow air to the first air blowing unit, an airflow generation unit configured to generate airflow in the first air blowing unit and the second air blowing unit, and an air blowing port configured to blow the air from the first air blowing unit to the medium after printing, the first air blowing unit includes a first air blowing flow path configured to blow air to the air blowing port, the second air blowing unit includes a second air blowing flow path configured to blow air to the first air blowing flow path and a communication port configured for communication between the second air blowing flow path and the first air blowing flow path, the second air blowing flow path has a greater cross-sectional area for blowing air than a cross-sectional area of the first air blowing flow path, the first air blowing unit is located downstream from the printing head in the transport direction of the medium and upstream from the processing unit in the transport direction of the medium, a part or all of the second air blowing unit is located between the housing and the processing unit in a direction along the scanning direction of the carriage, the first air blowing unit and the second air blowing unit are provided at positions where the first air blowing unit and the second air blowing unit face each other in the transport direction of the medium in a first specific region along the scanning direction of the carriage, and the communication port is located at least in the first specific region.

According to this configuration, the first air blowing unit is located downstream of the printing head and upstream of the processing unit in the transport direction of the medium, and it is possible to bring the carriage, the air blowing unit, and the processing unit close to each other in the transport direction. Therefore, it is possible to realize space saving of the printing apparatus.

In addition to this, the second air blowing unit having a greater cross-sectional area for blowing air than the first air blowing flow path is located between the housing and the processing unit in the direction along the scanning direction of the carriage. As a result, it is possible to realize space saving of the printing apparatus while securing the blowing amount of the air blown to the first air blowing flow path.

In addition to this, in the first specific region along the scanning direction of the carriage, the first air blowing unit and the second air blowing unit face each other in the transport direction of the medium, and air can be blown from the second air blowing flow path to the first air blowing flow path via the communication port. Thus, the pressure loss from the second air blowing flow path to the first air blowing flow path is not excessively increased. Therefore, it is possible to realize space saving of the printing apparatus without excessively increasing the pressure loss for blowing the air from the air blowing port.

(I) The second air blowing unit may be configured such that a cross-sectional area of the communication port when viewed in the transport direction of the medium is 20% or more of a maximum cross-sectional area of the second air blowing flow path when viewed in a direction along the scanning direction of the carriage.

According to this configuration, the pressure loss from the second air blowing flow path to the first air blowing flow path is not excessively increased. Therefore, it is possible to realize space saving of the printing apparatus without excessively increasing the pressure loss for blowing the air from the air blowing port.

(J) The second air blowing unit may be configured such that a minimum cross-sectional area of the second air blowing flow path when viewed from a direction along the scanning direction of the carriage is 30% or more of a maximum cross-sectional area of the second air blowing flow path when viewed from the direction along the scanning direction of the carriage.

According to this configuration, the pressure loss from the second air blowing flow path is not excessively increased. Therefore, it is possible to realize space saving of the printing apparatus without excessively increasing the pressure loss for blowing the air from the air blowing port.

(K) At least a part of the first air blowing unit may be provided overlapping with a part of a movement region of the carriage in plan view.

According to this configuration, it is possible to bring the first air blowing unit close to the carriage. Accordingly, it is possible to realize space saving in the transport direction of the medium with respect to the positions of the air blowing unit and the carriage. Therefore, it is possible to realize space saving of the printing apparatus.

(L) The first air blowing unit may include a partition wall configured to block the air blown from the air blowing port, and the partition wall may be provided upstream from the air blowing port in the transport direction of the medium so as to extend at least from the air blowing port toward the medium after printing.

According to this configuration, the air blown from the air blowing port is unlikely to flow upstream in the transport direction of the medium. Accordingly, it is possible to realize space saving of the printing apparatus without greatly affecting the ejection of the liquid from the printing head on the upstream in the transport direction of the medium.

(M) The partition wall may include, between the air blowing port and the medium after printing, a protruding portion protruding downstream in the transport direction of the medium.

According to this configuration, the air blown from the air blowing port is guided to the downstream in the transport direction of the medium by the protruding portion, and thus the air is further less likely to flow to the upstream in the transport direction of the medium. Accordingly, it is possible to realize space saving of the printing apparatus without greatly affecting the ejection of the liquid from the printing head on the upstream in the transport direction of the medium.

(N) A heater configured to increase a temperature of the air in the second air blowing flow path may be provided, wherein the heater may be a PTC heater located in the second air blowing flow path.

According to this configuration, it is possible to reduce the number of components and reduce the installation region of the heater, and it is possible to realize space saving of the printing apparatus. In addition, the heater can be easily controlled.

(O) The second air blowing flow path may be configured to incline downward in a vertical direction toward the communication port.

According to this configuration, in the second air blowing flow path, the air can be blown downward in the vertical direction toward the communication port communicating with the first air blowing flow path. As a result, it is possible to smoothly create airflow downward in the vertical direction in the first air blowing flow path. Therefore, it is possible to realize space saving of the printing apparatus without excessively increasing the pressure loss for blowing the air from the air blowing port.

(P) The first air blowing unit may include a guide portion configured to guide the air from the communication port in the first air blowing flow path, and the guide portion may extend in a direction along the scanning direction of the carriage and may be inclined so as to approach the medium after printing with a distance from the communication port increases in the direction along the scanning direction of the carriage.

According to this configuration, in the first air blowing flow path, the air from the communication port is guided in the direction along the scanning direction of the carriage. Further, in addition to this, in the first air blowing flow path, the air from the communication port is guided so as to approach the medium after printing with the distance from the communication port increases in the direction along the scanning direction of the carriage. Accordingly, in the direction along the scanning direction of the carriage, the blowing amount of the air from the communication port can be equalized, and further, the pressure loss in the first air blowing flow path can be reduced. Therefore, it is possible to realize space saving of the printing apparatus without excessively increasing the pressure loss for blowing the air from the air blowing port.

(Q) An exhaust unit configured to exhaust air may be provided, wherein a part or all of the exhaust unit may be provided between the housing and the processing unit at a position opposite to the second air blowing unit across the processing unit, and the first air blowing unit and the exhaust unit may be provided at positions where the first air blowing unit and the exhaust unit face each other in the transport direction of the medium in a second specific region along the scanning direction of the carriage.

According to this configuration, the exhaust unit is located between the housing and the processing unit in the direction along the scanning direction of the carriage at a position opposite to the second air blowing unit across the processing unit. Accordingly, it is possible to efficiently dry the medium after printing M, and to realize space saving of the printing apparatus.

(R) A roller configured to transport the medium after printing, and a holding unit configured to hold the roller are provided, wherein the exhaust unit may include an exhaust flow path configured to exhaust air, an exhaust flow generation unit configured to exhaust air in the exhaust flow path, and an air intake port configured to intake air between the air intake port and the medium after printing into the exhaust flow path, the holding unit may be located downstream from the printing head in the transport direction of the medium and upstream from the processing unit in the transport direction of the medium, the roller may be configured to press the medium after printing on which the processing related to the medium is performed by the processing unit, the holding unit may be located between the air intake port and the medium after printing, and the holding unit may include a through hole provided between the air intake port and the medium after printing.

According to this configuration, even in a case where the holding unit is located between the air intake port of the exhaust unit and the medium after printing, it is possible to suck the air between the exhaust unit and the medium after printing from the air intake port via the through hole provided in the holding unit. Therefore, it is possible to realize space saving of the printing apparatus without reducing the efficiency of exhausting the air between the exhaust unit and the medium after printing.

What is claimed is:

1. A printing apparatus comprising:
- a transport unit configured to transport a medium in a transport direction;
- a printing head configured to perform printing by ejecting liquid onto the medium transported by the transport unit;
- a carriage mounted with the printing head and configured to move in a scanning direction;
- an air blowing unit configured to blow air to the medium after printing on which printing is performed by the printing head;
- a processing unit configured to perform processing related to the medium; and
- a housing configured to accommodate the transport unit, the printing head, the carriage, the air blowing unit, and the processing unit, wherein the air blowing unit includes a first air blowing unit configured to blow air, a second air blowing unit configured to blow air to the first air blowing unit, an airflow generation unit configured to generate airflow in the first air blowing unit and the second air blowing unit, and an air blowing port configured to blow the air from the first air blowing unit to the medium after printing, the first air blowing unit includes a first air blowing flow path configured to blow air to the air blowing port, the second air blowing unit includes a second air blowing flow path configured to blow air to the first air blowing flow path and a communication port configured for communication between the second air blowing flow path and the first air blowing flow path, the second air blowing flow path has a greater cross-sectional area for blowing air than a cross-sectional area of the first air blowing flow path, the first air blowing unit is located downstream from the printing head in the transport direction of the medium and upstream from the processing unit in the transport direction of the medium, a part or all of the second air blowing unit is located between the housing and the processing unit in a direction along the scanning direction of the carriage, the first air blowing unit and the second air blowing unit are provided at positions where the first air blowing unit and the second air blowing unit face each other in the transport direction of the medium in a first specific region along the scanning direction of the carriage, and the communication port is located at least in the first specific region.

2. The printing apparatus according to claim 1, wherein the second air blowing unit is configured such that a cross-sectional area of the communication port when viewed in the transport direction of the medium is 20% or more of a maximum cross-sectional area of the second air blowing flow path when viewed in a direction along the scanning direction of the carriage.

3. The printing apparatus according to claim 2, wherein the second air blowing unit is configured such that a minimum cross-sectional area of the second air blowing flow path when viewed from a direction along the scanning direction of the carriage is 30% or more of a maximum cross-sectional area of the second air blowing flow path when viewed from the direction along the scanning direction of the carriage.

4. The printing apparatus according to claim 2, wherein at least a part of the first air blowing unit is provided overlapping with a part of a movement region of the carriage in plan view.

5. The printing apparatus according to claim 2, wherein the first air blowing unit includes a partition wall configured to block the air blown from the air blowing port, and the partition wall is provided upstream from the air blowing port in the transport direction of the medium so as to extend at least from the air blowing port toward the medium after printing.

6. The printing apparatus according to claim 2, comprising a heater configured to increase a temperature of the air in the second air blowing flow path, wherein the heater is a PTC heater located in the second air blowing flow path.

7. The printing apparatus according to claim 2, wherein the second air blowing flow path is configured to incline downward in a vertical direction toward the communication port.

8. The printing apparatus according to claim 2, wherein the first air blowing unit includes, in the first air blowing flow path, a guide portion configured to guide the air from the communication port, and the guide portion extends in a direction along the scanning direction of the carriage and is inclined so as to approach the medium after printing with a distance from the communication port in the direction along the scanning direction of the carriage.

9. The printing apparatus according to claim 2, comprising an exhaust unit configured to exhaust air, wherein a part or all of the exhaust unit is provided between the housing and the processing unit at a position opposite to the second air blowing unit across the processing unit, and the first air blowing unit and the exhaust unit are provided at positions where the first air blowing unit and the exhaust unit face each other in the transport direction of the medium in a second specific region along the scanning direction of the carriage.

10. The printing apparatus according to claim 1, wherein the second air blowing unit is configured such that a minimum cross-sectional area of the second air blowing flow path when viewed from a direction along the scanning direction of the carriage is 30% or more of a maximum cross-sectional area of the second air blowing flow path when viewed from the direction along the scanning direction of the carriage.

11. The printing apparatus according to claim 1, wherein at least a part of the first air blowing unit is provided overlapping with a part of a movement region of the carriage in plan view.

12. The printing apparatus according to claim 1, wherein the first air blowing unit includes a partition wall configured to block the air blown from the air blowing port, and the partition wall is provided upstream from the air blowing port in the transport direction of the medium so as to extend at least from the air blowing port toward the medium after printing.

13. The printing apparatus according to claim 12, wherein the partition wall includes, between the air blowing port and the medium after printing, a protruding portion protruding downstream in the transport direction of the medium.

14. The printing apparatus according to claim 1, comprising a heater configured to increase a temperature of the air in the second air blowing flow path, wherein the heater is a PTC heater located in the second air blowing flow path.

15. The printing apparatus according to claim 1, wherein the second air blowing flow path is configured to incline downward in a vertical direction toward the communication port.

16. The printing apparatus according to claim 1, wherein the first air blowing unit includes, in the first air blowing flow path, a guide portion configured to guide the air from the communication port, and the guide portion extends in a direction along the scanning direction of the carriage and is inclined so as to approach the medium after printing with a distance from the communication port in the direction along the scanning direction of the carriage.

17. The printing apparatus according to claim 1, comprising an exhaust unit configured to exhaust air, wherein a part or all of the exhaust unit is provided between the housing and the processing unit at a position opposite to the second air blowing unit across the processing unit, and the first air blowing unit and the exhaust unit are provided at positions where the first air blowing unit and the exhaust unit face each other in the transport direction of the medium in a second specific region along the scanning direction of the carriage.

18. The printing apparatus according to claim 17, comprising:

a roller configured to transport the medium after printing, and a holding unit configured to hold the roller, wherein the exhaust unit includes an exhaust flow path configured to exhaust air, an exhaust flow generation unit configured to exhaust air in the exhaust flow path, and an air intake port configured to intake air between the air intake port and the medium after printing into the exhaust flow path, the holding unit is located downstream from the printing head in the transport direction of the medium and upstream from the processing unit in the transport direction of the medium, the roller is configured to press the medium after printing on which the processing related to the medium is performed by the processing unit, the holding unit is located between the air intake port and the medium after printing, and the holding unit includes a through hole provided between the air intake port and the medium after printing.

* * * * *